United States Patent
Gao et al.

(10) Patent No.: US 11,558,086 B2
(45) Date of Patent: Jan. 17, 2023

(54) PUCCH TRANSMISSION METHOD, USER EQUIPMENT AND DEVICE

(71) Applicant: CHINA ACADEMY OF TELECOMMUNICATIONS TECHNOLOGY, Beijing (CN)

(72) Inventors: Xuejuan Gao, Beijing (CN); Ekpenyong Tony, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 62 days.

(21) Appl. No.: 16/638,200

(22) PCT Filed: Jun. 20, 2018

(86) PCT No.: PCT/CN2018/092034
§ 371 (c)(1),
(2) Date: Feb. 11, 2020

(87) PCT Pub. No.: WO2019/029277
PCT Pub. Date: Feb. 14, 2019

(65) Prior Publication Data
US 2020/0366339 A1 Nov. 19, 2020

(30) Foreign Application Priority Data
Aug. 11, 2017 (CN) .......................... 201710687967.5

(51) Int. Cl.
*H04W 72/04* (2009.01)
*H04B 7/0408* (2017.01)
(Continued)

(52) U.S. Cl.
CPC ......... *H04B 7/0408* (2013.01); *H04B 7/0404* (2013.01); *H04B 7/0695* (2013.01);
(Continued)

(58) Field of Classification Search
CPC ................ H04B 7/0408; H04B 7/0404; H04B 7/0695; H04B 7/088; H04B 17/373;
(Continued)

(56) References Cited

U.S. PATENT DOCUMENTS

2014/0073337 A1  3/2014 Hong et al.
2017/0012692 A1  1/2017 Kim et al.
(Continued)

FOREIGN PATENT DOCUMENTS

CN  1379558 A   11/2002
CN  103733542 A  4/2014
(Continued)

OTHER PUBLICATIONS

R1-1710202, ZTE, QCL design for UL and DL MIMO, Jun. 27-30, 2017 (Year: 2017).*
(Continued)

*Primary Examiner* — Mahbubul Bar Chowdhury
(74) *Attorney, Agent, or Firm* — Kilpatrick Townsend & Stockton, LLP

(57) ABSTRACT

Provided are a physical uplink control channel (PUCCH) transmission method, user equipment and device, used to solve the technical problem that there is no clear method or device in existing technology which supports a PUCCH transmission scenario in a new wireless communication system. The PUCCH transmission method comprises: determining an uplink beam used during PUCCH transmission on the basis of a downlink beam used by a physical downlink control channel (PDCCH) and/or a physical downlink shared channel (PDSCH); and carrying out PUCCH transmission using the determined uplink beam.

20 Claims, 8 Drawing Sheets

(51) Int. Cl.
  *H04B 7/0404* (2017.01)
  *H04B 7/06* (2006.01)
  *H04B 7/08* (2006.01)
  *H04L 5/00* (2006.01)
  *H04L 5/10* (2006.01)
  *H04W 72/12* (2009.01)

(52) U.S. Cl.
  CPC ........... *H04B 7/088* (2013.01); *H04L 5/0051* (2013.01); *H04L 5/0055* (2013.01); *H04L 5/10* (2013.01); *H04W 72/046* (2013.01); *H04W 72/0413* (2013.01); *H04W 72/1284* (2013.01)

(58) Field of Classification Search
  CPC ....... H04L 5/0051; H04L 5/0055; H04L 5/10; H04L 5/003; H04L 5/0053; H04L 5/00; H04W 72/0413; H04W 72/046; H04W 72/1284; H04W 72/02; H04W 72/04; H04W 16/28
  See application file for complete search history.

(56) References Cited

U.S. PATENT DOCUMENTS

| | | | |
|---|---|---|---|
| 2018/0234959 A1* | 8/2018 | Ahn | H04W 72/042 |
| 2018/0263024 A1* | 9/2018 | John Wilson | H04W 72/044 |
| 2018/0278467 A1* | 9/2018 | John Wilson | H04W 72/046 |
| 2020/0059951 A1* | 2/2020 | Frenne | H04L 5/0023 |
| 2020/0213058 A1* | 7/2020 | Choi | H04B 7/0695 |
| 2020/0374960 A1* | 11/2020 | Deenoo | H04W 72/14 |

FOREIGN PATENT DOCUMENTS

| | | |
|---|---|---|
| CN | 104735685 A | 6/2015 |
| CN | 106954260 A | 7/2017 |
| EP | 1191706 A2 | 3/2002 |
| EP | 3624529 A1 | 3/2020 |
| WO | 2013024852 A1 | 2/2013 |
| WO | 2016152655 A1 | 9/2016 |
| WO | 2016209055 A1 | 12/2016 |
| WO | 2017135987 A1 | 8/2017 |
| WO | 2018172994 A1 | 9/2018 |

OTHER PUBLICATIONS

Huawei et al., "Discussion on beam management aspects for DL MIMO", 3GPPTSG RAN WG1 Meeting #86bis, Lisbon, Portugal, Oct. 10-14, 2016, total 6 pages, R1-1609414.

MediaTek Inc. "Discussion on NR-PDCCH Structure", 3GPP TSG RAN WG1 Meeting #88bis, Spokane, USA, Apr. 3-7, 2017, total 7 pages, R1-1704442.

Qualcomm Incorporated, "Discussion on QCL", 3GPP TSG RAN WG1 NR Ad-Hoc#2, Jun. 27-30, 2017, Qingdao, China, total 5 pages, R1-1711176.

Qualcomm Incorporated "Control channel multi-beam operation", TSG-RAN WG1 #88bis, Spokane, USA, total 5 pages, R1-1705583.

ZTE "UL beam management for NR MIMO", 3GPP TSG RAN WG1 NR Ad-Hoc#2, Qingdao, P.R. China Jun. 27-30, 2017, total 8 pages, R1-1710184.

\* cited by examiner

PUCCH TRANSMISSION METHOD, USER EQUIPMENT AND DEVICE

The present application is a US National Stage of International Application No. PCT/CN2018/092034, filed on Jun. 20, 2018, which claims the priority from Chinese Patent Application No. 201710687967.5, filed with the Chinese Patent Office on Aug. 11, 2017 and entitled "PUCCH Transmission Method, User Equipment and Device", which is hereby incorporated by reference in its entirety.

FIELD

The invention relates to the field of communication technologies, and particularly to a PUCCH transmission method, user equipment and device.

BACKGROUND

With the development and change of the mobile communication service demand, the International Telecommunication Union (ITU), the 3rd Generation Partnership Project (3GPP) and other organizations all begin to research a new wireless communication system, e.g., 5 Generation New RAT (5G NR).

A new working scenario is defined in the new wireless communication system, where two Transmission and Reception Points (TRPs) respectively transmit the Physical Downlink Control Channel (PDCCH) and corresponding Physical Downlink Shared Channel (PDSCH) to the same terminal. The PDCCH and PDSCH from different TRPs are transmitted by using different beams, and in this scenario, there is no explicit solution to how the corresponding terminal performs the Physical Uplink Control Channel (PUCCH) transmission using different beams for the different TRPs.

SUMMARY

The embodiments of the invention provide a PUCCH transmission method, user equipment and device, so as to solve the technical problem in the prior art that there is no explicit method or device to support the PUCCH transmission scenario in the new wireless communication system.

In a first aspect, an embodiment of the invention provides a PUCCH transmission method, which includes:

determining an uplink beam for PUCCH transmission according to a downlink beam used by a PDCCH and/or PDSCH;

performing the PUCCH transmission with the determined uplink beam.

In a possible implementation, the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or the PDSCH is PDSCH of which the ACK/NACK needs to be fed back on the PUCCH.

In a possible implementation, determining an uplink beam for PUCCH transmission according to a downlink beam used by a PDCCH and/or PDSCH, and performing the PUCCH transmission with the determined uplink beam, includes:

determining a corresponding uplink Beam Pair Linkage, BPL, according to a downlink BPL corresponding to the received PDCCH and/or PDSCH, determining the uplink beam for the PUCCH transmission or a QCL relationship between a DMRS port of the PUCCH and a port on resources of a first reference signal according to the uplink BPL, and performing the PUCCH transmission with the uplink beam corresponding to the uplink BPL; or determining a QCL relationship between a DMRS port of the PUCCH and a port on resources of a first reference signal according to the uplink BPL, and performing the PUCCH transmission with the QCL relationship; or determining a corresponding uplink beam index according to a downlink BPL corresponding to the received PDCCH and/or PDSCH, and performing the PUCCH transmission with the uplink beam corresponding to the uplink beam index; or determining a QCL relationship between a DMRS port of the PUCCH and a port on resources of a first reference signal according to a downlink BPL corresponding to the received PDCCH and/or PDSCH, and performing the PUCCH transmission with the QCL relationship; or determining an uplink beam index for identifying the uplink beam performing the PUCCH transmission according to a downlink beam index of the downlink beam corresponding to the received PDCCH and/or PDSCH, and performing the PUCCH transmission with the uplink beam corresponding to the uplink beam index; or determining a QCL relationship between a DMRS port of the PUCCH and a port on resources of a first reference signal according to a QCL relationship between a DMRS port of the received PDCCH and/or PDSCH and a port on resources of a second reference signal, and performing the PUCCH transmission with the QCL relationship between the DMRS port of the PUCCH and the port on resources of the first reference signal; or determining a corresponding uplink BPL according to a QCL relationship between a DMRS port of the received PDCCH and/or PDSCH and a port on resources of a second reference signal, determining the uplink beam for the PUCCH transmission or a QCL relationship between a DMRS port of the PUCCH and a port on resources of a first reference signal according to the uplink BPL, and performing the PUCCH transmission with the uplink beam corresponding to the uplink BPL; or determining a QCL relationship between a DMRS port of the PUCCH and a port on resources of a first reference signal according to the uplink BPL, and performing the PUCCH transmission with the QCL relationship; or determining a corresponding uplink beam index according to a QCL relationship between a DMRS port of the received PDCCH and/or PDSCH and a port on resources of a second reference signal, and performing the PUCCH transmission with the uplink beam corresponding to the uplink beam index.

In a possible implementation, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible implementation, determining an uplink beam for PUCCH transmission according to a downlink beam used by a PDCCH and/or PDSCH, includes:

determining an uplink beam corresponding to the downlink beam used by the PDCCH and/or PDSCH as the uplink beam for the PUCCH transmission according to a predetermined correspondence between one or more downlink beams and one uplink beam.

In a possible implementation, determining an uplink beam for PUCCH transmission according to a downlink beam used by a PDCCH and/or PDSCH, includes:

when a plurality of PDCCHs and/or PDSCHs are received and different downlink beams are used for the plurality of PDCCHs and/or PDSCHs and ACK/NACKs related to the plurality of PDCCHs and/or PDSCHs are fed back at the same time, determining a plurality of uplink beams corresponding to the plurality of downlink beams, and selecting one from the plurality of uplink beams as the uplink beam for the PUCCH transmission;

performing the PUCCH transmission with the determined uplink beam, includes:

transmitting the ACK/NACKs related to the plurality of PDCCHs and/or PDSCHs on the same PUCCH with the determined uplink beam.

In a possible implementation, determining an uplink beam for PUCCH transmission according to a downlink beam used by a PDCCH and/or PDSCH, includes:

when a plurality of PDCCHs and/or PDSCHs are received and different beams are used for the plurality of PDCCHs and/or PDSCHs and ACK/NACKs related to the plurality of PDCCHs and/or PDSCHs are fed back at the same time, selecting one from the plurality of downlink beams, and determining the uplink beam for the PUCCH transmission according to the selected downlink beam;

performing the PUCCH transmission with the determined uplink beam, includes:

transmitting the ACK/NACKs related to the plurality of PDCCHs and/or PDSCHs on the same PUCCH with the determined uplink beam.

In a possible implementation, determining an uplink beam for PUCCH transmission according to a downlink beam used by a PDCCH and/or PDSCH, includes:

when a plurality of downlink beams and a plurality of uplink beams are divided into a plurality of groups where there is a correspondence between downlink and uplink beams in each group, then using any one or a combination of following ways:

first way: determining a first uplink beam according to a downlink beam-x used by a received first PDCCH and/or PDSCH, and determining that the first uplink beam is used to transmit a PUCCH carrying ACK/NACK related to the first PDCCH and/or PDSCH, wherein the downlink beam-x and the first uplink beam are in a same group and have a correspondence, and/or, determining a second uplink beam according to a downlink beam-y used by a received second PDCCH and/or PDSCH, and using the second uplink beam to transmit a PUCCH carrying ACK/NACK related to the second PDCCH and/or PDSCH, wherein the downlink beam-y and the second uplink beam are in a same group and have a correspondence; wherein ACK/NACKs related to PDCCHs and/or PDSCHs transmitted by using different downlink beams in a same beam group are transmitted at different times;

second way: when a plurality of PDCCHs and/or PDSCHs transmitted by using different downlink beams in a same group are received and ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, wherein the PUCCH carries the ACK/NACKs related to the PDCCHs and/or PDSCHs;

third way: when a plurality of PDCCHs and/or PDSCHs transmitted by using different downlink beams in a same group are received and ACK/NACKs related to the PDCCHs and/or PDSCHs are fed back at the same time, selecting one from the plurality of downlink beams, and determining the uplink beam for the PUCCH transmission according to the selected downlink beam, wherein the PUCCH carries the ACK/NACKs related to the PDCCHs and/or PDSCHs.

In a possible implementation, determining an uplink beam for PUCCH transmission according to a downlink beam used by a PDCCH and/or PDSCH, includes:

when a plurality of downlink beams are divided into a plurality of groups each of which corresponds to one uplink primary beam for the PUCCH transmission, then:

when a first PDCCH and/or PDSCH transmitted by using a downlink beam belonging to a first group is received, determining that a first uplink primary beam corresponding to the first group is used to transmit a PUCCH carrying ACK/NACK related to the first PDCCH and/or PDSCH, and/or, when a second PDCCH and/or PDSCH transmitted by using a downlink beam belonging to a second group is received, using a second uplink primary beam corresponding to the second group to transmit a PUCCH carrying ACK/NACK related to the second PDCCH and/or PDSCH.

In a possible implementation, selecting one from the plurality of uplink beams as the uplink beam for the PUCCH transmission, includes:

selecting one from the plurality of uplink beams as the uplink beam for the PUCCH transmission according to pre-configured or pre-agreed priorities of uplink beams or cells; or when the plurality of uplink beams contain a pre-configured or pre-agreed uplink primary beam, determining the uplink primary beam as the uplink beam for the PUCCH transmission; and when the at least one uplink beam does not contain the uplink primary beam, determining a secondary beam with a certain index in the at least one uplink beam as the uplink beam for the PUCCH transmission; or when there is an uplink beam corresponding to a pre-configured or pre-agreed primary cell in the plurality of uplink beams, taking the uplink beam corresponding to the primary cell as the uplink beam for the PUCCH transmission; and when there is no uplink beam corresponding to the primary cell in the at least one uplink beam, taking an uplink beam corresponding to a secondary cell as the uplink beam for the PUCCH transmission.

In a possible implementation, selecting one from the plurality of downlink beams, and determining the uplink beam for the PUCCH transmission according to the selected downlink beam, includes:

selecting one downlink beam according to pre-configured or pre-agreed uplink beam priorities, beam group priorities or cell priorities, and determining the uplink beam for the PUCCH transmission according to the selected downlink beam; or when a PDCCH and/or PDSCH transmitted by using a downlink primary beam is received, determining the uplink beam for the PUCCH transmission according to the downlink primary beam, and/or, when the PDCCH and/or PDSCH transmission is received on a primary cell, determining the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to a downlink secondary beam with a certain index used by the received PDCCH and/or PDSCH transmission, and/or, determining the uplink beam for the PUCCH transmission according to a downlink beam corresponding to a secondary cell receiving the PDCCH and/or PDSCH transmission; wherein the downlink primary beam and the primary cell are pre-configured or pre-agreed; or when a PDCCH and/or PDSCH transmitted by using a downlink beam in a downlink primary beam group is received, determining an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determining an uplink secondary beam corresponding to the downlink secondary beam group as the uplink beam for the PUCCH transmission; and if there are a plurality of downlink secondary beam groups, then selecting one downlink secondary beam group in accordance with priorities of the downlink secondary beam groups or an order of the index of the downlink secondary beam groups.

In a second aspect, an embodiment of the invention provides another PUCCH transmission method, which includes:

determining that a terminal determines an uplink beam for PUCCH transmission according to a downlink beam used by a PDCCH and/or PDSCH;

determining that the terminal performs the PUCCH transmission with the determined uplink beam.

In a possible implementation, the PDCCH is one or a combination of: the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or the PDSCH is PDSCH of which the ACK/NACK needs to be fed back on the PUCCH.

In a possible implementation, determining that the terminal determines an uplink beam for PUCCH transmission according to a downlink beam used by a PDCCH and/or PDSCH, and performs the PUCCH transmission with the determined uplink beam, includes:

determining that the terminal determines a corresponding uplink Beam Pair Linkage, BPL, according to a downlink BPL corresponding to the received PDCCH and/or PDSCH, determines the uplink beam for the PUCCH transmission or a QCL relationship between a DMRS port of the PUCCH and a port on resources of a first reference signal according to the uplink BPL, and performs the PUCCH transmission with the uplink beam corresponding to the uplink BPL; or determines a QCL relationship between a DMRS port of the PUCCH and a port on resources of a first reference signal according to the uplink BPL, and performs the PUCCH transmission with the QCL relationship; or determining that the terminal determines a corresponding uplink beam index according to a downlink BPL corresponding to the received PDCCH and/or PDSCH, and determining that the performs the PUCCH transmission with the uplink beam corresponding to the uplink beam index; or determining that the terminal determines a QCL relationship between a DMRS port of the PUCCH and a port on resources of a first reference signal according to a downlink BPL corresponding to the received PDCCH and/or PDSCH, and determining that the terminal performs the PUCCH transmission with the QCL relationship; or determining that the terminal determines an uplink beam index for identifying the uplink beam performing the PUCCH transmission according to a downlink beam index of the downlink beam corresponding to the received PDCCH and/or PDSCH, and determining that the terminal performs the PUCCH transmission with the uplink beam corresponding to the uplink beam index; or determining that the terminal determines a QCL relationship between a DMRS port of the PUCCH and a port on resources of a first reference signal according to a QCL relationship between a DMRS port of the received PDCCH and/or PDSCH and a port on resources of a second reference signal, and determining that the terminal performs the PUCCH transmission with the QCL relationship between the DMRS port of the PUCCH and the port on resources of the first reference signal; or determining that the terminal determines a corresponding uplink BPL according to a QCL relationship between a DMRS port of the received PDCCH and/or PDSCH and a port on resources of a second reference signal, determines the uplink beam for the PUCCH transmission or a QCL relationship between a DMRS port of the PUCCH and a port on resources of a first reference signal according to the uplink BPL, and performs the PUCCH transmission with the uplink beam corresponding to the uplink BPL; or determines a QCL relationship between a DMRS port of the PUCCH and a port on resources of a first reference signal according to the uplink BPL, and performs the PUCCH transmission with the QCL relationship; or determining that the terminal determines a corresponding uplink beam index according to a QCL relationship between a DMRS port of the received PDCCH and/or PDSCH and a port on resources of a second reference signal, and determining that the terminal performs the PUCCH transmission with the uplink beam corresponding to the uplink beam index.

In a possible implementation, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible implementation, determining that the terminal determines an uplink beam for PUCCH transmission according to a downlink beam used by a PDCCH and/or PDSCH, includes:

determining that the terminal determines an uplink beam corresponding to the downlink beam used by the PDCCH and/or PDSCH as the uplink beam for the PUCCH transmission according to a predetermined correspondence between one or more downlink beams and one uplink beam.

In a possible implementation, determining that the terminal determines an uplink beam for PUCCH transmission according to a downlink beam used by a PDCCH and/or PDSCH in accordance with the process of:

when a plurality of PDCCHs and/or PDSCHs are received and different downlink beams are used for the plurality of PDCCHs and/or PDSCHs and ACK/NACKs related to the plurality of PDCCHs and/or PDSCHs are fed back at the same time, determining a plurality of uplink beams corresponding to the plurality of downlink beams, and selecting one from the plurality of uplink beams as the uplink beam for the PUCCH transmission;

determining that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible implementation, determining that the terminal determines an uplink beam for PUCCH transmission according to a downlink beam used by a PDCCH and/or PDSCH in accordance with the process of:

when a plurality of PDCCHs and/or PDSCHs are received and different beams are used for the plurality of PDCCHs and/or PDSCHs and ACK/NACKs related to the plurality of PDCCHs and/or PDSCHs are fed back at the same time, selecting one from the plurality of downlink beams, and determining the uplink beam for the PUCCH transmission according to the selected downlink beam;

determining that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible implementation, determining that the terminal determines an uplink beam for PUCCH transmission according to a downlink beam used by a PDCCH and/or PDSCH in accordance with the process of:

when a plurality of downlink beams and a plurality of uplink beams are divided into a plurality of groups where there is a correspondence between downlink and uplink beams in each group, then:

first way: determining a first uplink beam according to a downlink beam-x used by a received first PDCCH and/or PDSCH, and determining that the first uplink beam is used to transmit a PUCCH carrying ACK/NACK related to the first PDCCH and/or PDSCH, wherein the downlink beam-x and the first uplink beam are in a same group and have a correspondence, and/or, determining a second uplink beam according to a downlink beam-y used by a received second PDCCH and/or PDSCH, and using the second uplink beam to transmit a PUCCH carrying ACK/NACK related to the second PDCCH and/or PDSCH, wherein the downlink beam-y and the second uplink beam are in a same group and have a correspondence; wherein ACK/NACKs related to PDCCHs and/or PDSCHs transmitted by using different downlink beams in a same beam group are transmitted at different times;

second way: when a plurality of PDCCHs and/or PDSCHs transmitted by using different downlink beams in a same group are received and ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, wherein the PUCCH carries the ACK/NACKs related to the PDCCHs and/or PDSCHs;

third way: when a plurality of PDCCHs and/or PDSCHs transmitted by using different downlink beams in a same group are received and ACK/NACKs related to the PDCCHs and/or PDSCHs are fed back at the same time, selecting one from the plurality of downlink beams, and determining the uplink beam for the PUCCH transmission according to the selected downlink beam, wherein the PUCCH carries the ACK/NACKs related to the PDCCHs and/or PDSCHs.

In a possible implementation, determining that the terminal determines an uplink beam for PUCCH transmission according to a downlink beam used by a PDCCH and/or PDSCH in accordance with the process of:

when a plurality of downlink beams are divided into a plurality of groups where each group corresponds to one uplink primary beam for the PUCCH transmission, then:

when a first PDCCH and/or PDSCH transmitted by using a downlink beam belonging to a first group is received, determining that a first uplink primary beam corresponding to the first group is used to transmit a PUCCH carrying ACK/NACK related to the first PDCCH and/or PDSCH, and/or, when a second PDCCH and/or PDSCH transmitted by using a downlink beam belonging to a second group is received, using a second uplink primary beam corresponding to the second group to transmit a PUCCH carrying ACK/NACK related to the second PDCCH and/or PDSCH.

In a possible implementation, selecting one from the plurality of uplink beams as the uplink beam for the PUCCH transmission, includes:

selecting one from the plurality of uplink beams as the uplink beam for the PUCCH transmission according to pre-configured or pre-agreed priorities of uplink beams or cells; or when the plurality of uplink beams contain a pre-configured or pre-agreed uplink primary beam, determining the uplink primary beam as the uplink beam for the PUCCH transmission; and when the at least one uplink beam does not contain the uplink primary beam, determining a secondary beam with a certain index in the at least one uplink beam as the uplink beam for the PUCCH transmission; or when there is an uplink beam corresponding to a pre-configured or pre-agreed primary cell in the plurality of uplink beams, taking the uplink beam corresponding to the primary cell as the uplink beam for the PUCCH transmission; and when there is no uplink beam corresponding to the primary cell in the at least one uplink beam, taking an uplink beam corresponding to a secondary cell as the uplink beam for the PUCCH transmission.

In a possible implementation, selecting one from the plurality of downlink beams, and determining the uplink beam for the PUCCH transmission according to the selected downlink beam, includes:

selecting one downlink beam according to pre-configured or pre-agreed uplink beam priorities, beam group priorities or cell priorities, and determining the uplink beam for the PUCCH transmission according to the selected downlink beam; or when a PDCCH and/or PDSCH transmitted by using a downlink primary beam is received, determining the uplink beam for the PUCCH transmission according to the downlink primary beam, and/or, when the PDCCH and/or PDSCH transmission is received on a primary cell, determining the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to a downlink secondary beam with a certain index used by the received PDCCH and/or PDSCH transmission, and/or, determining the uplink beam for the PUCCH transmission according to a downlink beam corresponding to a secondary cell receiving the PDCCH and/or PDSCH transmission; wherein the downlink primary beam and the primary cell are pre-configured or pre-agreed; or when a PDCCH and/or PDSCH transmitted by using a downlink beam in a downlink primary beam group is received, determining an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determining an uplink secondary beam corresponding to the downlink secondary beam group as the uplink beam for the PUCCH transmission; and if there are a plurality of downlink secondary beam groups, then selecting one downlink secondary beam group in accordance with priorities of the downlink secondary beam groups or an order of the index of the downlink secondary beam groups.

In a third aspect, an embodiment of the invention provides a user equipment, which includes:

a determining unit configured to determine an uplink beam for PUCCH transmission according to a downlink beam used by a PDCCH and/or PDSCH;

a transmission unit configured to perform the PUCCH transmission with the determined uplink beam.

In a possible implementation, the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or the PDSCH is PDSCH of which the ACK/NACK needs to be fed back on the PUCCH.

In a possible implementation, the determining unit is configured to determine a corresponding uplink Beam Pair Linkage, BPL, according to a downlink BPL corresponding to the received PDCCH and/or PDSCH, and determine the uplink beam for the PUCCH transmission or a QCL relationship between a DMRS port of the PUCCH and a port on resources of a first reference signal according to the uplink BPL, and the determining unit is configured to perform the PUCCH transmission with the uplink beam corresponding to the uplink BPL; or the determining unit is configured to determine a QCL relationship between a DMRS port of the PUCCH and a port on resources of a first reference signal according to the uplink BPL, and the transmission unit is configured to perform the PUCCH transmission with the QCL relationship; or the determining unit is configured to determine a corresponding uplink beam index according to a downlink BPL corresponding to the received PDCCH and/or PDSCH, and the transmission unit is configured to perform the PUCCH transmission with the uplink beam corresponding to the uplink beam index; or the determining unit is configured to determine a QCL relationship between a DMRS port of the PUCCH and a port on resources of a first reference signal according to a downlink BPL corresponding to the received PDCCH and/or PDSCH, and the transmission unit is configured to perform the PUCCH transmission with the QCL relationship; or the determining unit is configured to determine an uplink beam index for identifying the uplink beam performing the PUCCH transmission according to a downlink beam index of the downlink beam corresponding to the received PDCCH and/or PDSCH, and the transmission unit is configured to perform the PUCCH transmission with the uplink beam corresponding to the uplink beam index; or the determining unit is configured to determine a QCL relationship between a DMRS port of the PUCCH and a port on resources of a first reference signal according to a QCL relationship between a DMRS port of the received PDCCH and/or PDSCH and a port on resources of a second reference signal, and the transmission unit is configured to perform the PUCCH transmission with the QCL relationship between the DMRS port of the PUCCH and the port on resources of the first reference signal; or the determining unit is configured to determine a corresponding uplink BPL according to a QCL relationship between a DMRS port of the received PDCCH and/or PDSCH and a port on resources of a second reference signal, and determine the uplink beam for the PUCCH transmission or a QCL relationship between a DMRS port of the PUCCH and a port on resources of a first reference signal according to the uplink BPL, and the transmission unit is configured to perform the PUCCH transmission with the uplink beam corresponding to the uplink BPL; or the determining unit is configured to determine a QCL relationship between a DMRS port of the PUCCH and a port on resources of a first reference signal according to the uplink BPL, and the transmission unit is configured to perform the PUCCH transmission with the QCL relationship; or the determining unit is configured to determine a corresponding uplink beam index according to a QCL relationship between a DMRS port of the received PDCCH and/or PDSCH and a port on resources of a second reference signal, and the transmission unit is configured to perform the PUCCH transmission with the uplink beam corresponding to the uplink beam index.

In a possible implementation, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible implementation, the determining unit is configured to:

determine an uplink beam corresponding to the downlink beam used by the PDCCH and/or PDSCH as the uplink beam for the PUCCH transmission according to a predetermined correspondence between one or more downlink beams and one uplink beam.

In a possible implementation, the determining unit is configured to:

when a plurality of PDCCHs and/or PDSCHs are received and different downlink beams are used for the plurality of PDCCHs and/or PDSCHs and ACK/NACKs related to the plurality of PDCCHs and/or PDSCHs are fed back at the same time, determine a plurality of uplink beams corresponding to the plurality of downlink beams, and select one from the plurality of uplink beams as the uplink beam for the PUCCH transmission;

the transmission unit is configured to:

transmit the ACK/NACKs related to the plurality of PDCCHs and/or PDSCHs on the same PUCCH with the determined uplink beam.

In a possible implementation, the determining unit is configured to:

when a plurality of PDCCHs and/or PDSCHs are received and different beams are used for the plurality of PDCCHs and/or PDSCHs and ACK/NACKs related to the plurality of PDCCHs and/or PDSCHs are fed back at the same time, select one from the plurality of downlink beams, and determine the uplink beam for the PUCCH transmission according to the selected downlink beam;

the transmission unit is configured to:

transmit the ACK/NACKs related to the plurality of PDCCHs and/or PDSCHs on the same PUCCH with the determined uplink beam.

In a possible implementation, the determining unit is configured to:

when a plurality of downlink beams and a plurality of uplink beams are divided into a plurality of groups where there is a correspondence between downlink and uplink beams in each group, then use any one or a combination of following ways:

first way: determine a first uplink beam according to a downlink beam-x used by a received first PDCCH and/or PDSCH, and determine that the first uplink beam is used to transmit a PUCCH carrying ACK/NACK related to the first PDCCH and/or PDSCH, wherein the downlink beam-x and the first uplink beam are in a same group and have a correspondence, and/or, determine a second uplink beam according to a downlink beam-y used by a received second PDCCH and/or PDSCH, and use the second uplink beam to transmit a PUCCH carrying ACK/NACK related to the second PDCCH and/or PDSCH, wherein the downlink beam-y and the second uplink beam are in a same group and have a correspondence; wherein ACK/NACKs related to PDCCHs and/or PDSCHs transmitted by using different downlink beams in a same beam group are transmitted at different times;

second way: when a plurality of PDCCHs and/or PDSCHs transmitted by using different downlink beams in a same group are received and ACK/NACKs related to the PDCCHs and/or PDSCHs are fed back at the same time, determine a plurality of uplink beams corresponding to the plurality of downlink beams in the group, and select one from the plurality of uplink beams as the uplink beam for the PUCCH transmission, wherein the PUCCH carries the ACK/NACKs related to the PDCCHs and/or PDSCHs;

third way: when a plurality of PDCCHs and/or PDSCHs transmitted by using different downlink beams in a same group are received and ACK/NACKs related to the PDCCHs and/or PDSCHs are fed back at the same time, select one from the plurality of downlink beams, and determine the uplink beam for the PUCCH transmission according to the selected downlink beam, wherein the PUCCH carries the ACK/NACKs related to the PDCCHs and/or PDSCHs.

In a possible implementation, the determining unit is configured to:

when a plurality of downlink beams are divided into a plurality of groups where each group corresponds to one uplink primary beam for the PUCCH transmission, then:

when a first PDCCH and/or PDSCH transmitted by using a downlink beam belonging to a first group is received, determine that a first uplink primary beam corresponding to the first group is used to transmit a PUCCH carrying ACK/NACK related to the first PDCCH and/or PDSCH, and/or, when a second PDCCH and/or PDSCH transmitted by using a downlink beam belonging to a second group is received, use a second uplink primary beam corresponding to the second group to transmit a PUCCH carrying ACK/NACK related to the second PDCCH and/or PDSCH.

In a possible implementation, the determining unit is configured to:

select one from the plurality of uplink beams as the uplink beam for the PUCCH transmission according to pre-configured or pre-agreed priorities of uplink beams or cells; or when the plurality of uplink beams contain a pre-configured or pre-agreed uplink primary beam, determine the uplink primary beam as the uplink beam for the PUCCH transmission; and when the at least one uplink beam does not contain the uplink primary beam, determine a secondary beam with a certain index in the at least one uplink beam as the uplink beam for the PUCCH transmission; or when there is an uplink beam corresponding to a pre-configured or pre-agreed primary cell in the plurality of uplink beams, take the uplink beam corresponding to the primary cell as the uplink beam for the PUCCH transmission; and when there is no uplink beam corresponding to the primary cell in the at least one uplink beam, take an uplink beam corresponding to a secondary cell as the uplink beam for the PUCCH transmission.

In a possible implementation, the determining unit is configured to:

select one downlink beam according to pre-configured or pre-agreed uplink beam priorities, beam group priorities or cell priorities, and determine the uplink beam for the PUCCH transmission according to the selected downlink beam; or when a PDCCH and/or PDSCH transmitted by using a downlink primary beam is received, determine the uplink beam for the PUCCH transmission according to the downlink primary beam, and/or, when the PDCCH and/or PDSCH transmission is received on a primary cell, determine the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determine the uplink beam for the PUCCH transmission according to a downlink secondary beam with a certain index used by the received PDCCH and/or PDSCH transmission, and/or, determine the uplink beam for the PUCCH transmission according to a downlink beam corresponding to a secondary cell receiving the PDCCH and/or PDSCH transmission; wherein the downlink primary beam and the primary cell are pre-configured or pre-agreed; or when a PDCCH and/or PDSCH transmitted by using a downlink beam in a downlink primary beam group is received, determine an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determine an uplink secondary beam corresponding to the downlink secondary beam group as the uplink beam for the PUCCH transmission; and if there are a plurality of downlink secondary beam groups, then select one downlink secondary beam group in accordance with priorities of the downlink secondary beam groups or an order of the index of the downlink secondary beam groups.

In a fourth aspect, an embodiment of the invention provides a physical uplink control channel transmission device, which includes:

a determining unit configured to determine that a terminal determines an uplink beam for PUCCH transmission according to a downlink beam used by a PDCCH and/or PDSCH; and determine that the terminal performs the PUCCH transmission with the determined uplink beam.

In a possible implementation, the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or the PDSCH is PDSCH of which the ACK/NACK needs to be fed back on the PUCCH.

In a possible implementation, the determining unit is configured to:

determine that the terminal determines a corresponding uplink Beam Pair Linkage, BPL, according to a downlink BPL corresponding to the received PDCCH and/or PDSCH, determines the uplink beam for the PUCCH transmission or a QCL relationship between a DMRS port of the PUCCH and a port on resources of a first reference signal according to the uplink BPL, and performs the PUCCH transmission with the uplink beam corresponding to the uplink BPL; or determines a QCL relationship between a DMRS port of the PUCCH and a port on resources of a first reference signal according to the uplink BPL, and performs the PUCCH transmission with the QCL relationship; or determine that the terminal determines a corresponding uplink beam index according to a downlink BPL corresponding to the received PDCCH and/or PDSCH, and determine that the terminal performs the PUCCH transmission with the uplink beam corresponding to the uplink beam index; or determine that the terminal determines a QCL relationship between a DMRS port of the PUCCH and a port on resources of a first reference signal according to a downlink BPL corresponding to the received PDCCH and/or PDSCH, and determine that the terminal performs the PUCCH transmission with the QCL relationship; or determine that the terminal determines an uplink beam index for identifying the uplink beam performing the PUCCH transmission according to a downlink beam index of the downlink beam corresponding to the received PDCCH and/or PDSCH, and determine that the terminal performs the PUCCH transmission with the uplink beam corresponding to the uplink beam index; or determine that the terminal determines a QCL relationship between a DMRS port of the PUCCH and a port on resources of a first reference signal according to a QCL relationship between a DMRS port of the received PDCCH and/or PDSCH and a port on resources of a second reference signal, and determine that the terminal performs the PUCCH transmission with the QCL relationship between the DMRS port of the PUCCH and the port on resources of the first reference signal; or determine that the terminal determines a corresponding uplink BPL according to a QCL relationship between a DMRS port of the received PDCCH and/or PDSCH and a port on resources of a second reference signal, determines the uplink beam for the PUCCH transmission or a QCL relationship between a DMRS port of the PUCCH and a port on resources of a first reference signal according to the uplink BPL, and performs the PUCCH transmission with the uplink beam corresponding to the uplink BPL; or determines a QCL relationship between a DMRS port of the PUCCH and a port on resources of a first reference signal according to the uplink BPL, and performs the PUCCH transmission with the QCL relationship; or determine that the terminal determines a corresponding uplink beam index according to a QCL relationship between a DMRS port of the received PDCCH and/or PDSCH and a port on resources of a second reference signal, and determine that the terminal performs the PUCCH transmission with the uplink beam corresponding to the uplink beam index.

In a possible implementation, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible implementation, the determining unit is configured to:

determine that the terminal determines an uplink beam corresponding to the downlink beam used by the PDCCH and/or PDSCH as the uplink beam for the PUCCH transmission according to a predetermined correspondence between one or more downlink beams and one uplink beam.

In a possible implementation, the determining unit is configured to:

when a plurality of PDCCHs and/or PDSCHs are received and different downlink beams are used for the plurality of PDCCHs and/or PDSCHs and ACK/NACKs related to the plurality of PDCCHs and/or PDSCHs are fed back at the same time, determine a plurality of uplink beams corresponding to the plurality of downlink beams, and select one from the plurality of uplink beams as the uplink beam for the PUCCH transmission;

determine that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible implementation, the determining unit is configured to:

when a plurality of PDCCHs and/or PDSCHs are received and different beams are used for the plurality of PDCCHs and/or PDSCHs and ACK/NACKs related to the plurality of PDCCHs and/or PDSCHs are fed back at the same time, select one from the plurality of downlink beams, and determine the uplink beam for the PUCCH transmission according to the selected downlink beam;

determine that the terminal performs the PUCCH transmission with the determined uplink beam in accordance with the process of:

transmitting the ACK/NACKs related to the plurality of PDCCHs and/or PDSCHs on the same PUCCH with the determined uplink beam.

Ina possible implementation, the determining unit is configured to:

when a plurality of downlink beams and a plurality of uplink beams are divided into a plurality of groups where there is a correspondence between downlink and uplink beams in each group, then:

first way: determine a first uplink beam according to a downlink beam-x used by a received first PDCCH and/or PDSCH, and determine that the first uplink beam is used to transmit a PUCCH carrying ACK/NACK related to the first PDCCH and/or PDSCH, wherein the downlink beam-x and the first uplink beam are in a same group and have a correspondence, and/or, determine a second uplink beam according to a downlink beam-y used by a received second PDCCH and/or PDSCH, and use the second uplink beam to transmit a PUCCH carrying ACK/NACK related to the second PDCCH and/or PDSCH, wherein the downlink beam-y and the second uplink beam are in a same group and have a correspondence; wherein ACK/NACKs related to PDCCHs and/or PDSCHs transmitted by using different downlink beams in a same beam group are transmitted at different times;

second way: when a plurality of PDCCHs and/or PDSCHs transmitted by using different downlink beams in a same group are received and ACK/NACKs related to the PDCCHs and/or PDSCHs are fed back at the same time, determine a plurality of uplink beams corresponding to the plurality of downlink beams in the group, and select one from the plurality of uplink beams as the uplink beam for the PUCCH transmission, wherein the PUCCH carries the ACK/NACKs related to the PDCCHs and/or PDSCHs;

third way: when a plurality of PDCCHs and/or PDSCHs transmitted by using different downlink beams in a same group are received and ACK/NACKs related to the PDCCHs and/or PDSCHs are fed back at the same time, select one from the plurality of downlink beams, and determine the uplink beam for the PUCCH transmission according to the selected downlink beam, wherein the PUCCH carries the ACK/NACKs related to the PDCCHs and/or PDSCHs.

In a possible implementation, the determining unit is configured to:

when a plurality of downlink beams are divided into a plurality of groups where each group corresponds to one uplink primary beam for the PUCCH transmission, then:

when a first PDCCH and/or PDSCH transmitted by using a downlink beam belonging to a first group is received, determine that a first uplink primary beam corresponding to the first group is used to transmit a PUCCH carrying ACK/NACK related to the first PDCCH and/or PDSCH, and/or, when a second PDCCH and/or PDSCH transmitted by using a downlink beam belonging to a second group is received, use a second uplink primary beam corresponding to the second group to transmit a PUCCH carrying ACK/NACK related to the second PDCCH and/or PDSCH.

In a possible implementation, the determining unit is configured to:

select one from the plurality of uplink beams as the uplink beam for the PUCCH transmission according to pre-configured or pre-agreed priorities of uplink beams or cells; or when the plurality of uplink beams contain a pre-configured or pre-agreed uplink primary beam, determine the uplink primary beam as the uplink beam for the PUCCH transmission; and when the at least one uplink beam does not contain the uplink primary beam, determine a secondary beam with a certain index in the at least one uplink beam as the uplink beam for the PUCCH transmission; or when there is an uplink beam corresponding to a pre-configured or pre-agreed primary cell in the plurality of uplink beams, take the uplink beam corresponding to the primary cell as the uplink beam for the PUCCH transmission; and when there is no uplink beam corresponding to the primary cell in the at least one uplink beam, take an uplink beam corresponding to a secondary cell as the uplink beam for the PUCCH transmission.

In a possible implementation, the determining unit is configured to:

select one downlink beam according to pre-configured or pre-agreed uplink beam priorities, beam group priorities or cell priorities, and determine the uplink beam for the PUCCH transmission according to the selected downlink beam; or when a PDCCH and/or PDSCH transmitted by using a downlink primary beam is received, determine the uplink beam for the PUCCH transmission according to the downlink primary beam, and/or, when the PDCCH and/or PDSCH transmission is received on a primary cell, determine the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determine the uplink beam for the PUCCH transmission according to a downlink secondary beam with a certain index used by the received PDCCH and/or PDSCH transmission, and/or, determine the uplink beam for the PUCCH transmission according to a downlink beam corresponding to a secondary cell receiving the PDCCH and/or PDSCH transmission; wherein the downlink primary beam and the primary cell are pre-configured or pre-agreed; or when a PDCCH and/or PDSCH transmitted by using a downlink beam in a downlink primary beam group is received, determine an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determine an uplink secondary beam corresponding to the downlink secondary beam group as the uplink beam for the PUCCH transmission; and if there are a plurality of downlink secondary beam groups, then select one downlink secondary beam group in accordance with priorities of the downlink secondary beam groups or an order of the index of the downlink secondary beam groups.

In a fifth aspect, an embodiment of the invention provides another user equipment, which includes a processor, and a memory and a transceiver connected with the processor;

the processor is configured to read programs in the memory to perform the process of:

determining an uplink beam for PUCCH transmission according to a downlink beam used by a PDCCH and/or PDSCH;

controlling the transceiver to perform the PUCCH transmission with the determined uplink beam.

In a possible implementation, the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or the PDSCH is PDSCH of which the ACK/NACK needs to be fed back on the PUCCH.

In a possible implementation, a corresponding uplink Beam Pair Linkage, BPL, is determined according to a downlink BPL corresponding to the received PDCCH and/or PDSCH, the uplink beam for the PUCCH transmission or a QCL relationship between a DMRS port of the PUCCH and a port on resources of a first reference signal is determined according to the uplink BPL, and the transceiver is controlled to perform the PUCCH transmission with the uplink beam corresponding to the uplink BPL; or a QCL relationship between a DMRS port of the PUCCH and a port on resources of a first reference signal is determined according to the uplink BPL, and the transceiver is controlled to perform the PUCCH transmission with the QCL relationship; or a corresponding uplink beam index is determined according to a downlink BPL corresponding to the received PDCCH and/or PDSCH, and the transceiver is controlled to perform the PUCCH transmission with the uplink beam corresponding to the uplink beam index; or a QCL relationship between a DMRS port of the PUCCH and a port on resources of a first reference signal is determined according to a downlink BPL corresponding to the received PDCCH and/or PDSCH, and the transceiver is controlled to perform the PUCCH transmission with the QCL relationship; or an uplink beam index for identifying the uplink beam performing the PUCCH transmission is determined according to a downlink beam index of the downlink beam corresponding to the received PDCCH and/or PDSCH, and the transceiver is controlled to perform the PUCCH transmission with the uplink beam corresponding to the uplink beam index; or a QCL relationship between a DMRS port of the PUCCH and a port on resources of a first reference signal is determined according to a QCL relationship between a DMRS port of the received PDCCH and/or PDSCH and a port on resources of a second reference signal, and the transceiver is controlled to perform the PUCCH transmission with the QCL relationship between the DMRS port of the PUCCH and the port on resources of the first reference signal; or a corresponding uplink BPL is determined according to a QCL relationship between a DMRS port of the received PDCCH and/or PDSCH and a port on resources of a second reference signal, the uplink beam for the PUCCH transmission or a QCL relationship between a DMRS port of the PUCCH and a port on resources of a first reference signal is determined according to the uplink BPL, and the transceiver is controlled to perform the PUCCH transmission with the uplink beam corresponding to the uplink BPL; or a QCL relationship between a DMRS port of the PUCCH and a port on resources of a first reference signal is determined according to the uplink BPL, and the transceiver is controlled to perform the PUCCH transmission with the QCL relationship; or a corresponding uplink beam index is determined according to a QCL relationship between a DMRS port of the received PDCCH and/or PDSCH and a port on resources of a second reference signal, and the transceiver is controlled to perform the PUCCH transmission with the uplink beam corresponding to the uplink beam index.

In a possible implementation, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible implementation, determining an uplink beam for PUCCH transmission according to a downlink beam used by a PDCCH and/or PDSCH, includes:

determining an uplink beam corresponding to the downlink beam used by the PDCCH and/or PDSCH as the uplink beam for the PUCCH transmission according to a predetermined correspondence between one or more downlink beams and one uplink beam.

In a possible implementation, determining an uplink beam for PUCCH transmission according to a downlink beam used by a PDCCH and/or PDSCH, includes:

when a plurality of PDCCHs and/or PDSCHs are received and different downlink beams are used for the plurality of PDCCHs and/or PDSCHs and ACK/NACKs related to the plurality of PDCCHs and/or PDSCHs are fed back at the same time, determining a plurality of uplink beams corresponding to the plurality of downlink beams, and selecting one from the plurality of uplink beams as the uplink beam for the PUCCH transmission;

controlling the transceiver to perform the PUCCH transmission with the determined uplink beam, includes:

controlling the transceiver to transmit the ACK/NACKs related to the plurality of PDCCHs and/or PDSCHs on the same PUCCH with the determined uplink beam.

In a possible implementation, determining an uplink beam for PUCCH transmission according to a downlink beam used by a PDCCH and/or PDSCH, includes:

when a plurality of PDCCHs and/or PDSCHs are received and different beams are used for the plurality of PDCCHs and/or PDSCHs and ACK/NACKs related to the plurality of PDCCHs and/or PDSCHs are fed back at the same time, selecting one from the plurality of downlink beams, and determining the uplink beam for the PUCCH transmission according to the selected downlink beam;

controlling the transceiver to perform the PUCCH transmission with the determined uplink beam, includes:

controlling the transceiver to transmit the ACK/NACKs related to the plurality of PDCCHs and/or PDSCHs on the same PUCCH with the determined uplink beam.

In a possible implementation, determining an uplink beam for PUCCH transmission according to a downlink beam used by a PDCCH and/or PDSCH, includes:

when a plurality of downlink beams and a plurality of uplink beams are divided into a plurality of groups where there is a correspondence between downlink and uplink beams in each group, then using any one or a combination of following ways:

first way: determining a first uplink beam according to a downlink beam-x used by a received first PDCCH and/or PDSCH, and determining that the first uplink beam is used to transmit a PUCCH carrying ACK/NACK related to the first PDCCH and/or PDSCH, wherein the downlink beam-x and the first uplink beam are in a same group and have a correspondence, and/or, determining a second uplink beam according to a downlink beam-y used by a received second PDCCH and/or PDSCH, and using the second uplink beam to transmit a PUCCH carrying ACK/NACK related to the second PDCCH and/or PDSCH, wherein the downlink beam-y and the second uplink beam are in a same group and have a correspondence; wherein ACK/NACKs related to PDCCHs and/or PDSCHs transmitted by using different downlink beams in a same beam group are transmitted at different times;

second way: when a plurality of PDCCHs and/or PDSCHs transmitted by using different downlink beams in a same group are received and ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, wherein the PUCCH carries the ACK/NACKs related to the PDCCHs and/or PDSCHs;

third way: when a plurality of PDCCHs and/or PDSCHs transmitted by using different downlink beams in a same group are received and ACK/NACKs related to the PDCCHs and/or PDSCHs are fed back at the same time, selecting one from the plurality of downlink beams, and determining the uplink beam for the PUCCH transmission according to the selected downlink beam, wherein the PUCCH carries the ACK/NACKs related to the PDCCHs and/or PDSCHs.

In a possible implementation, determining an uplink beam for PUCCH transmission according to a downlink beam used by a PDCCH and/or PDSCH, includes:

when a plurality of downlink beams are divided into a plurality of groups where each group corresponds to one uplink primary beam for the PUCCH transmission, then:

when a first PDCCH and/or PDSCH transmitted by using a downlink beam belonging to a first group is received, determining that a first uplink primary beam corresponding to the first group is used to transmit a PUCCH carrying ACK/NACK related to the first PDCCH and/or PDSCH, and/or, when a second PDCCH and/or PDSCH transmitted by using a downlink beam belonging to a second group is received, using a second uplink primary beam corresponding to the second group to transmit a PUCCH carrying ACK/NACK related to the second PDCCH and/or PDSCH.

In a possible implementation, selecting one from the plurality of uplink beams as the uplink beam for the PUCCH transmission, includes:

selecting one from the plurality of uplink beams as the uplink beam for the PUCCH transmission according to pre-configured or pre-agreed priorities of uplink beams or cells; or when the plurality of uplink beams contain a pre-configured or pre-agreed uplink primary beam, determining the uplink primary beam as the uplink beam for the PUCCH transmission; and when the at least one uplink beam does not contain the uplink primary beam, determining a secondary beam with a certain index in the at least one uplink beam as the uplink beam for the PUCCH transmission; or when there is an uplink beam corresponding to a pre-configured or pre-agreed primary cell in the plurality of uplink beams, taking the uplink beam corresponding to the primary cell as the uplink beam for the PUCCH transmission; and when there is no uplink beam corresponding to the primary cell in the at least one uplink beam, taking an uplink beam corresponding to a secondary cell as the uplink beam for the PUCCH transmission.

In a possible implementation, selecting one from the plurality of downlink beams, and determining the uplink beam for the PUCCH transmission according to the selected downlink beam, includes:

selecting one downlink beam according to pre-configured or pre-agreed uplink beam priorities, beam group priorities or cell priorities, and determining the uplink beam for the PUCCH transmission according to the selected downlink beam; or when a PDCCH and/or PDSCH transmitted by using a downlink primary beam is received, determining the uplink beam for the PUCCH transmission according to the downlink primary beam, and/or, when the PDCCH and/or PDSCH transmission is received on a primary cell, determining the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to a downlink secondary beam with a certain index used by the received PDCCH and/or PDSCH transmission, and/or, determining the uplink beam for the PUCCH transmission according to a downlink beam corresponding to a secondary cell receiving the PDCCH and/or PDSCH transmission; wherein the downlink primary beam and the primary cell are pre-configured or pre-agreed; or when a PDCCH and/or PDSCH transmitted by using a downlink beam in a downlink primary beam group is received, determining an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determining an uplink secondary beam corresponding to the downlink secondary beam group as the uplink beam for the PUCCH transmission; and if there are a plurality of downlink secondary beam groups, then selecting one downlink secondary beam group in accordance with priorities of the downlink secondary beam groups or an order of the index of the downlink secondary beam groups.

In a sixth aspect, an embodiment of the invention provides another physical uplink control channel transmission device, which includes a processor and a memory connected with the processor;

the processor is configured to read programs in the memory to perform the process of:

determining that a terminal determines an uplink beam for PUCCH transmission according to a downlink beam used by a PDCCH and/or PDSCH;

determining that the terminal performs the PUCCH transmission with the determined uplink beam.

In a possible implementation, the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or the PDSCH is PDSCH of which the ACK/NACK needs to be fed back on the PUCCH.

In a possible implementation, determining that the terminal determines an uplink beam for PUCCH transmission according to a downlink beam used by a PDCCH and/or PDSCH, and performs the PUCCH transmission with the determined uplink beam, includes:

determining that the terminal determines a corresponding uplink Beam Pair Linkage, BPL, according to a downlink BPL corresponding to the received PDCCH and/or PDSCH, determines the uplink beam for the PUCCH transmission or a QCL relationship between a DMRS port of the PUCCH and a port on resources of a first reference signal according to the uplink BPL, and performs the PUCCH transmission with the uplink beam corresponding to the uplink BPL; or determines a QCL relationship between a DMRS port of the PUCCH and a port on resources of a first reference signal according to the uplink BPL, and performs the PUCCH transmission with the QCL relationship; or determining that the terminal determines a corresponding uplink beam index according to a downlink BPL corresponding to the received PDCCH and/or PDSCH, and determining that the terminal performs the PUCCH transmission with the uplink beam corresponding to the uplink beam index; or determining that the terminal determines a QCL relationship between a DMRS port of the PUCCH and a port on resources of a first reference signal according to a downlink BPL corresponding to the received PDCCH and/or PDSCH, and determining that the terminal performs the PUCCH transmission with the QCL relationship; or determining that the terminal determines an uplink beam index for identifying the uplink beam performing the PUCCH transmission according to a downlink beam index of the downlink beam corresponding to the received PDCCH and/or PDSCH, and determining that the terminal performs the PUCCH transmission with the uplink beam corresponding to the uplink beam index; or determining that the terminal determines a QCL relationship between a DMRS port of the PUCCH and a port on resources of a first reference signal according to a QCL relationship between a DMRS port of the received PDCCH and/or PDSCH and a port on resources of a second reference signal, and determining that the terminal performs the PUCCH transmission with the QCL relationship between the DMRS port of the PUCCH and the port on resources of the first reference signal; or determining that the terminal determines a corresponding uplink BPL according to a QCL relationship between a DMRS port of the received PDCCH and/or PDSCH and a port on resources of a second reference signal, determines the uplink beam for the PUCCH transmission or a QCL relationship between a DMRS port of the PUCCH and a port on resources of a first reference signal according to the uplink BPL, and performs the PUCCH transmission with the uplink beam corresponding to the uplink BPL; or determines a QCL relationship between a DMRS port of the PUCCH and a port on resources of a first reference signal according to the uplink BPL, and performs the PUCCH transmission with the QCL relationship; or determining that the terminal determines a corresponding uplink beam index according to a QCL relationship between a DMRS port of the received PDCCH and/or PDSCH and a port on resources of a second reference signal, and determining that the terminal performs the PUCCH transmission with the uplink beam corresponding to the uplink beam index.

In a possible implementation, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible implementation, determining that the terminal determines an uplink beam for PUCCH transmission according to a downlink beam used by a PDCCH and/or PDSCH, includes:

determining that the terminal determines an uplink beam corresponding to the downlink beam used by the PDCCH and/or PDSCH as the uplink beam for the PUCCH transmission according to a predetermined correspondence between one or more downlink beams and one uplink beam.

In a possible implementation, determining that the terminal determines an uplink beam for PUCCH transmission according to a downlink beam used by a PDCCH and/or PDSCH in accordance with the process of:

when a plurality of PDCCHs and/or PDSCHs are received and different downlink beams are used for the plurality of PDCCHs and/or PDSCHs and ACK/NACKs related to the plurality of PDCCHs and/or PDSCHs are fed back at the same time, determining a plurality of uplink beams corresponding to the plurality of downlink beams, and selecting one from the plurality of uplink beams as the uplink beam for the PUCCH transmission;

determining that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible implementation, determining that the terminal determines an uplink beam for PUCCH transmission according to a downlink beam used by a PDCCH and/or PDSCH in accordance with the process of:

when a plurality of PDCCHs and/or PDSCHs are received and different beams are used for the plurality of PDCCHs and/or PDSCHs and ACK/NACKs related to the plurality of PDCCHs and/or PDSCHs are fed back at the same time, selecting one from the plurality of downlink beams, and determining the uplink beam for the PUCCH transmission according to the selected downlink beam;

determining that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible implementation, determining that the terminal determines an uplink beam for PUCCH transmission according to a downlink beam used by a PDCCH and/or PDSCH in accordance with the process of:

when a plurality of downlink beams and a plurality of uplink beams are divided into a plurality of groups where there is a correspondence between downlink and uplink beams in each group, then:

first way: determining a first uplink beam according to a downlink beam-x used by a received first PDCCH and/or PDSCH, and determining that the first uplink beam is used to transmit a PUCCH carrying ACK/NACK related to the first PDCCH and/or PDSCH, wherein the downlink beam-x and the first uplink beam are in a same group and have a correspondence, and/or, determining a second uplink beam according to a downlink beam-y used by a received second PDCCH and/or PDSCH, and using the second uplink beam to transmit a PUCCH carrying ACK/NACK related to the second PDCCH and/or PDSCH, wherein the downlink beam-y and the second uplink beam are in a same group and have a correspondence; wherein ACK/NACKs related to PDCCHs and/or PDSCHs transmitted by using different downlink beams in a same beam group are transmitted at different times;

second way: when a plurality of PDCCHs and/or PDSCHs transmitted by using different downlink beams in a same group are received and ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, wherein the PUCCH carries the ACK/NACKs related to the PDCCHs and/or PDSCHs;

third way: when a plurality of PDCCHs and/or PDSCHs transmitted by using different downlink beams in a same group are received and ACK/NACKs related to the PDCCHs and/or PDSCHs are fed back at the same time, selecting one from the plurality of downlink beams, and determining the uplink beam for the PUCCH transmission according to the selected downlink beam, wherein the PUCCH carries the ACK/NACKs related to the PDCCHs and/or PDSCHs.

In a possible implementation, determining that the terminal determines an uplink beam for PUCCH transmission according to a downlink beam used by a PDCCH and/or PDSCH in accordance with the process of:

when a plurality of downlink beams are divided into a plurality of groups where each group corresponds to one uplink primary beam for the PUCCH transmission, then:

when a first PDCCH and/or PDSCH transmitted by using a downlink beam belonging to a first group is received, determining that a first uplink primary beam corresponding to the first group is used to transmit a PUCCH carrying ACK/NACK related to the first PDCCH and/or PDSCH, and/or, when a second PDCCH and/or PDSCH transmitted by using a downlink beam belonging to a second group is received, using a second uplink primary beam corresponding to the second group to transmit a PUCCH carrying ACK/NACK related to the second PDCCH and/or PDSCH.

In a possible implementation, selecting one from the plurality of uplink beams as the uplink beam for the PUCCH transmission, includes:

selecting one from the plurality of uplink beams as the uplink beam for the PUCCH transmission according to pre-configured or pre-agreed priorities of uplink beams or cells; or when the plurality of uplink beams contain a pre-configured or pre-agreed uplink primary beam, determining the uplink primary beam as the uplink beam for the PUCCH transmission; and when the at least one uplink beam does not contain the uplink primary beam, determining a secondary beam with a certain index in the at least one uplink beam as the uplink beam for the PUCCH transmission; or when there is an uplink beam corresponding to a pre-configured or pre-agreed primary cell in the plurality of uplink beams, taking the uplink beam corresponding to the primary cell as the uplink beam for the PUCCH transmission; and when there is no uplink beam corresponding to the primary cell in the at least one uplink beam, taking an uplink beam corresponding to a secondary cell as the uplink beam for the PUCCH transmission.

In a possible implementation, selecting one from the plurality of downlink beams, and determining the uplink beam for the PUCCH transmission according to the selected downlink beam, includes:

selecting one downlink beam according to pre-configured or pre-agreed uplink beam priorities, beam group priorities or cell priorities, and determining the uplink beam for the PUCCH transmission according to the selected downlink beam; or when a PDCCH and/or PDSCH transmitted by using a downlink primary beam is received, determining the uplink beam for the PUCCH transmission according to the downlink primary beam, and/or, when the PDCCH and/or PDSCH transmission is received on a primary cell, determining the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to a downlink secondary beam with a certain index used by the received PDCCH and/or PDSCH transmission, and/or, determining the uplink beam for the PUCCH transmission according to a downlink beam corresponding to a secondary cell receiving the PDCCH and/or PDSCH transmission; wherein the downlink primary beam and the primary cell are pre-configured or pre-agreed; or when a PDCCH and/or PDSCH transmitted by using a downlink beam in a downlink primary beam group is received, determining an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determining an uplink secondary beam corresponding to the downlink secondary beam group as the uplink beam for the PUCCH transmission; and if there are a plurality of downlink secondary beam groups, then selecting one downlink secondary beam group in accordance with priorities of the downlink secondary beam groups or an order of the index of the downlink secondary beam groups.

One or more of the above-mentioned technical solutions have the following technical effects or advantages.

In the embodiments of the invention, a solution of determining the uplink beam for the PUCCH transmission in the 5G NR is provided, which can support the PUCCH transmission scenario in the new wireless communication system to ensure the correct PUCCH transmission.

Further, in the embodiments of the invention, the uplink beam for PUCCH transmission is determined according to the downlink beam used by the PDCCH and/or PDSCH, so the PUCCH transmission solution in the embodiments of the invention may adjust the required uplink beam by adjusting the PDCCH and/or PDSCH according to the actual demand, and can implement the correct PUCCH transmission without increasing the additional notification signalling.

BRIEF DESCRIPTION OF THE DRAWINGS

In order to illustrate the embodiments of the invention or the technical solutions in the prior art more clearly, the accompanying figures which need to be used in describing the embodiments or the prior art will be introduced below briefly. Obviously the accompanying figures described below are some embodiments of the invention, and other accompanying figures can also be obtained by those ordinary skilled in the art according to these accompanying figures without creative labor.

DETAILED DESCRIPTION OF EMBODIMENTS

Figure 1:
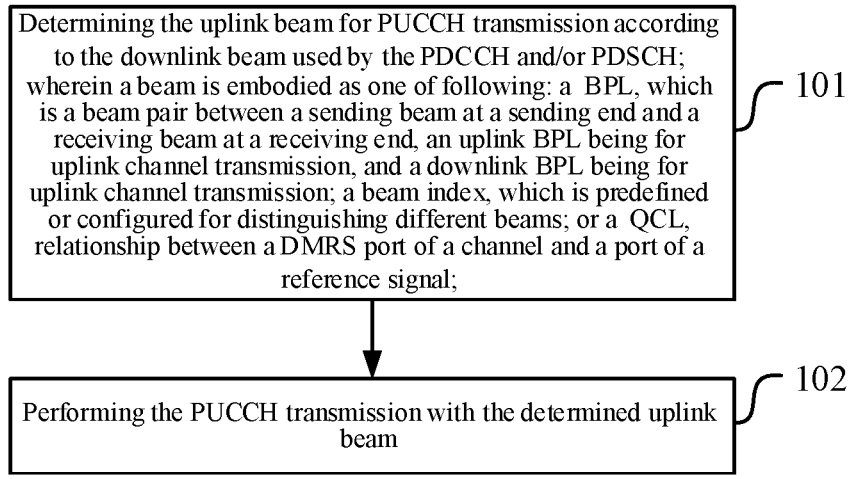
FIG. 1 is a flow chart of a PUCCH transmission method according to an embodiment of the invention.

In order to make the purposes, technical solutions and advantages of the invention clearer, the technical solutions in the embodiments of the invention will be described clearly and completely below in combination with the accompanying figures in the embodiments of the invention. Obviously the described embodiments are a part of the embodiments of the invention but not all the embodiments.

Based upon the embodiments of the invention, all of other embodiments obtained by those ordinary skilled in the art without creative work pertain to the protection scope of the invention. In the case of no conflict, the embodiments and the features therein in the invention can be combined with each other arbitrarily. Also, although the logical order is shown in the flow chart, the shown or described steps may be performed in an order different from the order shown here in certain cases.

Furthermore, the term "and/or" herein is simply an association relationship describing the associated objects, indicating that there may be three relationships, for example, A and/or B may represent: only A, both A and B, and only B. Furthermore, the character "/" herein generally indicates the "or" relationship of the front and back associated objects without special illustration.

At first, the application scenario of the invention will be introduced.

The PUCCH is used to transmit the Uplink Control Information (UCI) containing the ACKnowledgement/Non-ACKnowledgement (ACK/NACK), Channel State Information (CSI), Scheduling Request (SR) or other information.

In the 5G NR system, different TRPs use different beams for transmission. When a sending beam is used by a TRP for a downlink transmission such as PDCCH or PDSCH or downlink reference signal (e.g., Channel State Information-Reference Signal (CSI-RS) or the like), different receiving beams are used by the terminal for the downlink transmission, that is, there is a linkage between one sending beam and one receiving beam, which is called Beam Pair Linkage (BPL). Similarly for the uplink transmission, there is also the corresponding BPL. The BPL may be obtained by beam training. Generally the network side may pre-configure the downlink beams corresponding to one or more PDCCHs for the terminal to detect the PDCCHs. The beam may be embodied by notifying the terminal that there is the Quasi-Co-Location (QCL) relationship between the Demodulation Reference Signal (DMRS) port of a channel and different CSI-RS configurations (e.g., port, resource and others), so the purpose of notifying the terminal of the used beam may be achieved by notifying a certain CSI-RS configuration. The beam may also be embodied by the BPL, and at this time, the terminal may be pre-configured with a plurality of BPLs. When the terminal is notified of the index of one of the BPLs, the terminal may determine the corresponding BPL according to the notified BPL index, and determine the beam to be used according to the sending and receiving beam pair defined in the BPL. For the above two embodying modes, there is no need to define the beam, while the meaning of the beam is implicitly embodied by other definition mode. Of course, the beam may also be embodied directly by the beam index, and at this time, a plurality of beams are pre-configured or pre-defined for the terminal, and the terminal may determine the beam to be used according to the notified beam index. The above definition of beam is applicable to both the uplink and the downlink, and the definition of beam may be adopted in the same way or different ways for the uplink and the downlink. For example, the BPL, the QCL, or the beam index is used in the definition for both, or the BPL or QCL is used in the definition for the downlink and the beam index is used in the definition for the uplink, or the like. The uplink BPL is the beam pair for the uplink channel transmission, and the downlink BPL is the beam pair for the downlink channel transmission; the uplink beam is the beam for the uplink channel transmission at the terminal side and is the beam for receiving the uplink channel at the base station side, and the downlink beam is the beam for receiving the downlink channel at the terminal side and is the beam for sending the downlink channel at the base station side.

It should be stated that the following embodiments are according to the same inventive concept, and when understanding or interpreting the content of any of the embodiments, the reference may be made to the content recorded in other embodiments.

In order for the better understanding of the above-mentioned technical solution, the above-mentioned technical solution will be illustrated below in details in combination with the drawings of the specification and the specific embodiments.

First Embodiment

Referring to FIG. 1, an embodiment of the invention provides a PUCCH transmission method, which may be used to perform the PUCCH transmission between devices, for example, a User Equipment (UE) may perform the PUCCH transmission to a base station. Here, the user equipment may be a Personal Computer (PC), notebook, mobile phone, Internet of things device, wearable device or the like. The specific type of the user equipment is not limited by the embodiment of the invention. The base station may be any receiving node, e.g., TRP, legacy base station, relay node or the like.

The flow of the PUCCH transmission method in the embodiment of the invention may be as follows:

Step 101: determining an uplink beam for the PUCCH transmission according to the downlink beam used by the PDCCH and/or PDSCH;

Step 102: performing the PUCCH transmission with the determined uplink beam.

In an embodiment of the invention, the uplink beam is the beam in the sending process of the terminal and the receiving process of the base station, and may be embodied as a beam or a beam pair; and the downlink beam is the beam in the sending process of the base station and the receiving process of the terminal, and may be embodied as a beam or a beam pair.

In an embodiment of the invention, the uplink beam or downlink beam is specifically embodied as:

first type: BPL; the BPL from base station to terminal and the BPL from terminal to base station may be obtained by beam training, and if the reciprocity between the uplink and downlink channels exists, the BPL from terminal to base station may be obtained according to the BPL from base station to terminal through the reciprocity, that is, the beam used for the uplink transmission may be determined according to the beam used for the downlink transmission;

or second type: beam index; the results of different sending and receiving combinations (e.g., the used combination of the pre-coding matrix) obtained by measuring/ training on the configured resources of multiple first reference signals are recorded, directly defined as different beams and represented by the beam indexes, the uplink and downlink beams may be defined respectively, and if the reciprocity between the uplink and downlink channels exists, the corresponding uplink beam may be obtained according to the downlink beam through the reciprocity;

or third type: the QCL relationship between the DMRS port of the PUCCH and all ports or a certain port on resources of a first reference signal; where the first reference signal is one or more of CSI-RS, SRS and other signals; that is, the resources, or the resources and ports, of multiple first reference signal are pre-configured. In the case of different resources, or different combinations of resources and ports, different sending and receiving combination results obtained by measuring/training are recorded as the transmission scheme of the corresponding resource, or the corresponding resource and port. When a terminal is notified of the resource, or the resource and port, of a first reference signal, that is, the terminal is notified of that the DMRS of the channel to be transmitted and the notified port of the first reference signal resource have the QCL relationship, namely, the transmission scheme on the resource, or the corresponding resource and port are required to perform the transmission (receiving or sending), i.e., the recorded precoding matrix corresponding to receiving or sending is used to perform the transmission. If the reciprocity between the uplink and downlink channels exists, the uplink QCL relationship may be obtained according to the downlink QCL relationship.

In a possible embodiment, the PDCCH is one or a combination of: PDCCH of which ACK/NACK needs to be fed back on the PUCCH, PDCCH corresponding to PDSCH of which the ACK/NACK needs to be fed back on the PUCCH, and multicast PDCCH; and/or the PDSCH is PDSCH of which the ACK/NACK needs to be fed back on the PUCCH.

Here, there is a correspondence between the multicast PDCCH and the time-domain resource position where the PUCCH is transmitted, that is, the multicast PDCCH is transmitted in the time slot where the PUCCH is transmitted or in the predetermined corresponding time slot.

In a possible embodiment, as shown in FIGS. 6-14, determining the uplink beam for the PUCCH transmission according to the downlink beam used by the PDCCH and/or PDSCH, and performing the PUCCH transmission with the determined uplink beam, includes:

1011A, determining the corresponding uplink Beam Pair Linkage, BPL, according to the downlink BPL corresponding to the received PDCCH and/or PDSCH, determining the uplink beam for the PUCCH transmission or the QCL relationship between the DMRS port of the PUCCH and the port on resources of a first reference signal according to the uplink BPL, and 1021A, performing the PUCCH transmission with the uplink beam corresponding to the uplink BPL; or 1011B, determining the QCL relationship between the DMRS port of the PUCCH and the port on resources of a first reference signal according to the uplink BPL, and 1021B, performing the PUCCH transmission with the QCL relationship; or

1012, determining the corresponding uplink beam index according to the downlink BPL corresponding to the received PDCCH and/or PDSCH, and 1022, performing the PUCCH transmission with the uplink beam corresponding to the uplink beam index; or

1013, determining the QCL relationship between the DMRS port of the PUCCH and the port on resources of a first reference signal according to the downlink BPL corresponding to the received PDCCH and/or PDSCH, and 1023, performing the PUCCH transmission with the QCL relationship; or

1014, determining the uplink beam index for identifying the uplink beam performing the PUCCH transmission according to the downlink beam index of the downlink beam corresponding to the received PDCCH and/or PDSCH, and 1024, performing the PUCCH transmission with the uplink beam corresponding to the uplink beam index; or

1015, determining the QCL relationship between the DMRS port of the PUCCH and the port on resources of a first reference signal according to the QCL relationship between the DMRS port of the received PDCCH and/or PDSCH and the port on resources of a second reference signal, and 1025, performing the PUCCH transmission with the QCL relationship between the DMRS port of the PUCCH and the port on resources of the first reference signal; or

1016A, determining the corresponding uplink BPL according to the QCL relationship between the DMRS port of the received PDCCH and/or PDSCH and the port on resources of a second reference signal, determining the uplink beam for the PUCCH transmission or the QCL relationship between the DMRS port of the PUCCH and the port on resources of a first reference signal according to the uplink BPL, and 1026A, performing the PUCCH transmission with the uplink beam corresponding to the uplink BPL; or 1016B, determining the QCL relationship between the DMRS port of the PUCCH and the port on resources of a first reference signal according to the uplink BPL, and 1026B, performing the PUCCH transmission with the QCL relationship; or

1017, determining the corresponding uplink beam index according to the QCL relationship between the DMRS port of the received PDCCH and/or PDSCH and the port on resources of a second reference signal, and 1027, performing the PUCCH transmission with the uplink beam corresponding to the uplink beam index.

In a possible embodiment, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

The above-mentioned second reference signal may be the CSI-RS.

In a possible embodiment, determining the uplink beam for the PUCCH transmission according to the downlink beam used by the PDCCH and/or PDSCH, includes:

determining the uplink beam corresponding to the downlink beam used by the PDCCH and/or PDSCH as the uplink beam for the PUCCH transmission according to the predetermined correspondence between one or more downlink beams and one uplink beam.

In a possible embodiment, determining the uplink beam for the PUCCH transmission according to the downlink beam used by the PDCCH and/or PDSCH, includes:

when a plurality of PDCCHs and/or PDSCHs are received, different downlink beams are used for the plurality of PDCCHs and/or PDSCHs and the ACK/NACKs related to the plurality of PDCCHs and/or PDSCHs are fed back at the same time, determining a plurality of uplink beams corresponding to the plurality of downlink beams, and selecting one from the plurality of uplink beams as the uplink beam for the PUCCH transmission;

performing the PUCCH transmission with the determined uplink beam, includes:

transmitting the ACK/NACKs related to the plurality of PDCCHs and/or PDSCHs on the same PUCCH with the determined uplink beam.

In an embodiment of the invention, the ACK/NACK related to the PDCCH specifically includes: the ACK/NACK of the PDCCH which is the PDCCH indicating the Semi-Persistent Schedule (SPS) resource release, and the ACK/NACK of a PDSCH corresponding to the PDCCH. The fact that the ACK/NACKs are transmitted at the same time described above means that the HARQ-ACK feedback timings indicated by the above PDCCHs are the same, or the time-domain positions determined according to the HARQ-ACK (HARQ: Hybrid Automatic Repeat Request) feedback timings indicated by the above PDCCHs and/or the time-domain resource positions indicated in the above PDCCHs are the same.

In a possible embodiment, determining the uplink beam for the PUCCH transmission according to the downlink beam used by the PDCCH and/or PDSCH, includes:

when a plurality of PDCCHs and/or PDSCHs are received, different beams are used for the plurality of PDCCHs and/or PDSCHs and the ACK/NACKs related to the plurality of PDCCHs and/or PDSCHs are fed back at the same time, selecting one from the plurality of downlink beams, and determining the uplink beam for the PUCCH transmission according to the selected downlink beam;

performing the PUCCH transmission with the determined uplink beam, includes:

transmitting the ACK/NACKs related to the plurality of PDCCHs and/or PDSCHs on the same PUCCH with the determined uplink beam.

In a possible embodiment, determining the uplink beam for the PUCCH transmission according to the downlink beam used by the PDCCH and/or PDSCH, includes:

when a plurality of downlink beams and a plurality of uplink beams are divided into a plurality of groups, where there is a correspondence between downlink and uplink beams in each group, then using any one or a combination of following ways:

first way: determining a first uplink beam according to the downlink beam-x used for a received first PDCCH and/or PDSCH, and determining that the first uplink beam is used to transmit the PUCCH carrying the ACK/NACK related to the first PDCCH and/or PDSCH, where the downlink beam-x and the first uplink beam are in a same group and have a correspondence, and/or, determining a second uplink beam according to the downlink beam-y used by a received second PDCCH and/or PDSCH, and using the second uplink beam to transmit the PUCCH carrying the ACK/NACK related to the second PDCCH and/or PDSCH, where the downlink beam-y and the second uplink beam are in a same group and have a correspondence; where the ACK/NACKs related to the PDCCHs and/or PDSCHs transmitted by different downlink beams in a same beam group are transmitted at different times;

second way: when a plurality of PDCCHs and/or PDSCHs transmitted by using different downlink beams in a same group are received and the ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, where the PUCCH carries the ACK/NACKs related to the PDCCHs and/or PDSCHs;

third way: when a plurality of PDCCHs and/or PDSCHs transmitted by using different downlink beams in a same group are received and the ACK/NACKs related to the PDCCHs and/or PDSCHs are fed back at the same time, selecting one from the plurality of downlink beams, and determining the uplink beam for the PUCCH transmission according to the selected downlink beam, where the PUCCH carries the ACK/NACKs related to the PDCCHs and/or PDSCHs.

That is, for the second and third ways, each group is processed independently, where an uplink beam is determined as the transmission beam of the PUCCH carrying the ACK/NACKs related to the PDCCHs and/or PDSCHs transmitted by the downlink beam in the group according to the downlink beam in the group.

In a possible embodiment, determining the uplink beam for the PUCCH transmission according to the downlink beam used by the PDCCH and/or PDSCH, includes:

when a plurality of downlink beams are divided into a plurality of groups where each group corresponds to one uplink primary beam for the PUCCH transmission, then:

when a first PDCCH and/or PDSCH transmitted by using the downlink beam belonging to a first group is received, determining that a first uplink primary beam corresponding to the first group is used to transmit the PUCCH carrying the ACK/NACK related to the first PDCCH and/or PDSCH, and/or, when a second PDCCH and/or PDSCH transmitted by using the downlink beam belonging to a second group is received, using a second uplink primary beam corresponding to the second group to transmit the PUCCH carrying the ACK/NACK related to the second PDCCH and/or PDSCH.

In a possible embodiment, selecting one from the plurality of uplink beams as the uplink beam for the PUCCH transmission, includes:

selecting one from the plurality of uplink beams as the uplink beam for the PUCCH transmission according to the pre-configured or pre-agreed priorities of the uplink beams or cells; for example, the certain number order of the beams or cells is taken as the priority (ascending or descending order); or when the plurality of uplink beams contain a pre-configured or pre-agreed uplink primary beam, determining the uplink primary beam as the uplink beam for the PUCCH transmission; and when the at least one uplink beam does not contain the uplink primary beam, determining a secondary beam with a certain index in the at least one uplink beam as the uplink beam for the PUCCH transmission (for example, numbering from smallest to largest or from largest to smallest); or when there is the uplink beam corresponding to the pre-configured or pre-agreed primary cell in the plurality of uplink beams, taking the uplink beam corresponding to the primary cell as the uplink beam for the PUCCH transmission; and when there is no uplink beam corresponding to the primary cell in the at least one uplink beam, taking the uplink beam corresponding to the secondary cell as the uplink beam for the PUCCH transmission; if there are a plurality of secondary cells, selecting the uplink beam corresponding to the secondary cell with the certain number (for example, numbering from smallest to largest or from largest to smallest).

Here, if the selection is performed within the beam group, the definitions in this embodiment are all directed to this group.

In a possible embodiment, selecting one from the plurality of downlink beams, and determining the uplink beam for the PUCCH transmission according to the selected downlink beam, includes:

selecting one downlink beam according to the pre-configured or pre-agreed downlink beam priorities, beam group priorities or cell priorities, and determining the uplink beam for the PUCCH transmission according to the selected downlink beam; for example, the certain number order of the beams or beam groups or cells is taken as the priority (ascending or descending order); or when the PDCCH and/or PDSCH transmitted by using the downlink primary beam is received, determining the uplink beam for the PUCCH transmission according to the downlink primary beam, and/or, when the PDCCH and/or PDSCH transmission is received on the primary cell, determining the uplink beam for the PUCCH transmission according to the downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to the downlink secondary beam with the certain index (for example, numbering from smallest to largest or from largest to smallest) used by the received PDCCH and/or PDSCH transmission, and/or, determining the uplink beam for the PUCCH transmission according to the downlink beam corresponding to the secondary cell receiving the PDCCH and/or PDSCH transmission; if there are a plurality of secondary cells, determining the uplink beam for the PUCCH transmission according to the downlink beam corresponding to the secondary cell with the certain number (for example, numbering from smallest to largest or from largest to smallest) receiving the PDCCH and/or PDSCH transmission; where the downlink primary beam and the primary cell are pre-configured or pre-agreed; or when the PDCCH and/or PDSCH transmitted by using the downlink beam in the downlink primary beam group is received, determining the uplink primary beam corresponding to the primary beam group as the uplink beam for the PUCCH transmission, where the primary beam group and the uplink primary beam corresponding to the primary group are pre-configured or pre-defined; and when no PDCCH and/or PDSCH transmitted by using any downlink beam in the downlink primary beam group is received, if the PDCCH and/or PDSCH transmitted by using the downlink beam in the downlink secondary beam group is received, then determining the uplink secondary beam corresponding to the downlink secondary beam group as the uplink beam for the PUCCH transmission; and if there are a plurality of downlink secondary beam groups, then selecting one downlink secondary beam group in accordance with the priorities of the downlink secondary beam groups or the order of the index of the downlink secondary beam groups (for example, numbering from smallest to largest or from largest to smallest).

Here, if the selection is performed within the beam group, the definitions in this embodiment are all directed to this group.

Here, if one downlink beam group contains multiple downlink beams, it is assumed that in the same group feedback time of one ACK/NACK only corresponds to the PDCCH and/or PDSCH using one downlink beam in the group, or the above definition ways of priority or primary/secondary beam may be reused for selection, for example: according to the downlink beam priority in the downlink beam group, the beam for the PUCCH transmission is determined according to the downlink beam with the highest priority in the downlink beam group, or the primary downlink beam in the beam group is pre-defined and the beam for the PUCCH transmission is determined preferentially according to the primary downlink beam. If no PDCCH transmission and/or PDSCH transmission is performed on the primary downlink beam, the beam for the PUCCH transmission is determined according to the downlink secondary beam, or one of the uplink beams determined according to a plurality of downlink beams is selected as the beam for the PUCCH transmission according to the priorities of the uplink beams, whether the primary uplink beam is contained and the like.

In a possible embodiment, determining the uplink beam for the PUCCH transmission according to the downlink beam used by the PDCCH and/or PDSCH, includes:

when a plurality of downlink beams are divided into a plurality of groups where each group corresponds to one uplink primary beam for the PUCCH transmission, then:

when a plurality of PDCCHs and/or PDSCHs using different downlink beams are received and the ACK/NACKs related to the plurality of PDCCHs and/or PDSCHs are not fed back at the same time, performing the above process for each of the plurality of PDCCHs and/or PDSCHs respectively, and determining the uplink beam to be used by the PUCCH carrying the ACK/NACK of each PDCCH and/or PDSCH.

Second Embodiment

Figure 2:
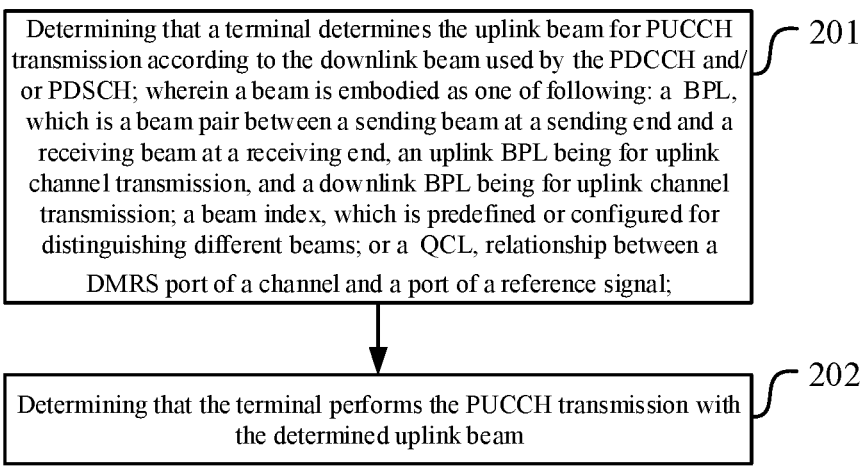
FIG. 2 is a flow chart of another PUCCH transmission method according to an embodiment of the invention.

Referring to FIG. 2, according to the same inventive concept as the first embodiment, the embodiment of the invention provides another PUCCH transmission method, which includes the following steps.

Step 201: determining that a terminal determines the uplink beam for the PUCCH transmission according to the downlink beam used by the PDCCH and/or PDSCH;

Step 202: determining that the terminal performs the PUCCH transmission with the determined uplink beam.

In a possible embodiment, the PDCCH is one or a combination of: PDCCH of which ACK/NACK needs to be fed back on the PUCCH, PDCCH corresponding to PDSCH of which the ACK/NACK needs to be fed back on the PUCCH, and multicast PDCCH; and/or the PDSCH is PDSCH of which the ACK/NACK needs to be fed back on the PUCCH.

In a possible embodiment, as shown in FIGS. 15-23, determining that the terminal determines the uplink beam for the PUCCH transmission according to the downlink beam used by the PDCCH and/or PDSCH, and performs the PUCCH transmission with the determined uplink beam, includes:

2011A, determining that the terminal determines the corresponding uplink Beam Pair Linkage, BPL, according to the downlink BPL corresponding to the received PDCCH and/or PDSCH, determines the uplink beam for the PUCCH transmission or the QCL relationship between the DMRS port of the PUCCH and the port on resources of a first reference signal according to the uplink BPL, and 2021B, performs the PUCCH transmission with the uplink beam corresponding to the uplink BPL; or 2021A, determines the QCL relationship between the DMRS port of the PUCCH and the port on resources of a first reference signal according to the uplink BPL, and 2022B, performs the PUCCH transmission with the QCL relationship; or

2012, determining that the terminal determines the corresponding uplink beam index according to the downlink BPL corresponding to the received PDCCH and/or PDSCH, and 2022, determining that the terminal performs the PUCCH transmission with the uplink beam corresponding to the uplink beam index; or

2013, determining that the terminal determines the QCL relationship between the DMRS port of the PUCCH and the port on resources of a first reference signal according to the downlink BPL corresponding to the received PDCCH and/or PDSCH, and 2023, determining that the terminal performs the PUCCH transmission with the QCL relationship; or

2014, determining that the terminal determines the uplink beam index for identifying the uplink beam performing the PUCCH transmission according to the downlink beam index of the downlink beam corresponding to the received PDCCH and/or PDSCH, and 2024, determining that the terminal performs the PUCCH transmission with the uplink beam corresponding to the uplink beam index; or

2015, determining that the terminal determines the QCL relationship between the DMRS port of the PUCCH and the port on resources of a first reference signal according to the QCL relationship between the DMRS port of the received PDCCH and/or PDSCH and the port on resources of a second reference signal, and 2025, determining that the terminal performs the PUCCH transmission with the QCL relationship between the DMRS port of the PUCCH and the port on resources of the first reference signal; or

2016A, determining that the terminal determines the corresponding uplink BPL according to the QCL relationship between the DMRS port of the received PDCCH and/or PDSCH and the port on resources of a second reference signal, determines the uplink beam for the PUCCH transmission or the QCL relationship between the DMRS port of the PUCCH and the port on resources of a first reference signal according to the uplink BPL, and 2026A, performs the PUCCH transmission with the uplink beam corresponding to the uplink BPL; or 2016B, determines the QCL relationship between the DMRS port of the PUCCH and the port on resources of a first reference signal according to the uplink BPL, and 2026B, performs the PUCCH transmission with the QCL relationship; or

2017, determining that the terminal determines the corresponding uplink beam index according to the QCL relationship between the DMRS port of the received PDCCH and/or PDSCH and the port on resources of a second reference signal, and 2027, determining that the terminal performs the PUCCH transmission with the uplink beam corresponding to the uplink beam index.

In a possible embodiment, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible embodiment, determining that the terminal determines the uplink beam for the PUCCH transmission according to the downlink beam used by the PDCCH and/or PDSCH, includes:

determining that the terminal determines the uplink beam corresponding to the downlink beam used by the PDCCH and/or PDSCH as the uplink beam for the PUCCH transmission according to the predetermined correspondence between one or more downlink beams and one uplink beam.

In a possible embodiment, determining that the terminal determines the uplink beam for the PUCCH transmission according to the downlink beam used by the PDCCH and/or PDSCH in accordance with the process of:

when a plurality of PDCCHs and/or PDSCHs are received, different downlink beams are used for the plurality of PDCCHs and/or PDSCHs and the ACK/NACKs related to the plurality of PDCCHs and/or PDSCHs are fed back at the same time, determining a plurality of uplink beams corresponding to the plurality of downlink beams, and selecting one from the plurality of uplink beams as the uplink beam for the PUCCH transmission;

determining that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible embodiment, determining that the terminal determines the uplink beam for the PUCCH transmission according to the downlink beam used by the PDCCH and/or PDSCH in accordance with the process of:

when a plurality of PDCCHs and/or PDSCHs are received, different beams are used for the plurality of PDCCHs and/or PDSCHs and the ACK/NACKs related to the plurality of PDCCHs and/or PDSCHs are fed back at the same time, selecting one from the plurality of downlink beams, and determining the uplink beam for the PUCCH transmission according to the selected downlink beam;

determining that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible embodiment, determining that the terminal determines the uplink beam for the PUCCH transmission according to the downlink beam used by the PDCCH and/or PDSCH in accordance with the process of:

when a plurality of downlink beams and a plurality of uplink beams are divided into a plurality of groups, where there is a correspondence between downlink and uplink beams in each group, then using any one or a combination of following ways:

first way: determining a first uplink beam according to the downlink beam-x used for a received first PDCCH and/or PDSCH, and determining that the first uplink beam is used to transmit the PUCCH carrying the ACK/NACK related to the first PDCCH and/or PDSCH, where the downlink beam-x and the first uplink beam are in a same group and have a correspondence, and/or, determining a second uplink beam according to the downlink beam-y used by a received second PDCCH and/or PDSCH, and using the second uplink beam to transmit the PUCCH carrying the ACK/NACK related to the second PDCCH and/or PDSCH, where the downlink beam-y and the second uplink beam are in a same group and have a correspondence; where the ACK/NACKs related to the PDCCHs and/or PDSCHs transmitted by different downlink beams in a same beam group are transmitted at different times;

second way: when a plurality of PDCCHs and/or PDSCHs transmitted by using different downlink beams in a same group are received and the ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, where the PUCCH carries the ACK/NACKs related to the PDCCHs and/or PDSCHs;

third way: when a plurality of PDCCHs and/or PDSCHs transmitted by using different downlink beams in a same group are received and the ACK/NACKs related to the PDCCHs and/or PDSCHs are fed back at the same time, selecting one from the plurality of downlink beams, and determining the uplink beam for the PUCCH transmission according to the selected downlink beam, where the PUCCH carries the ACK/NACKs related to the PDCCHs and/or PDSCHs.

In a possible embodiment, determining that the terminal determines the uplink beam for the PUCCH transmission according to the downlink beam used by the PDCCH and/or PDSCH in accordance with the process of:

when a plurality of downlink beams are divided into a plurality of groups where each group corresponds to one uplink primary beam for the PUCCH transmission, then:

when a first PDCCH and/or PDSCH transmitted by using the downlink beam belonging to a first group is received, determining that a first uplink primary beam corresponding to the first group is used to transmit the PUCCH carrying the ACK/NACK related to the first PDCCH and/or PDSCH, and/or, when a second PDCCH and/or PDSCH transmitted by using the downlink beam belonging to a second group is received, using a second uplink primary beam corresponding to the second group to transmit the PUCCH carrying the ACK/NACK related to the second PDCCH and/or PDSCH.

In a possible embodiment, selecting one from the plurality of uplink beams as the uplink beam for the PUCCH transmission, includes:

selecting one from the plurality of uplink beams as the uplink beam for the PUCCH transmission according to the pre-configured or pre-agreed priorities of uplink beams or cells; or when the plurality of uplink beams contain a pre-configured or pre-agreed uplink primary beam, determining the uplink primary beam as the uplink beam for the PUCCH transmission; and when the at least one uplink beam does not contain the uplink primary beam, determining a secondary beam with a certain index in the at least one uplink beam as the uplink beam for the PUCCH transmission; or when there is the uplink beam corresponding to the pre-configured or pre-agreed primary cell in the plurality of uplink beams, taking the uplink beam corresponding to the primary cell as the uplink beam for the PUCCH transmission; and when there is no uplink beam corresponding to the primary cell in the at least one uplink beam, taking the uplink beam corresponding to the secondary cell as the uplink beam for the PUCCH transmission.

In a possible embodiment, selecting one from the plurality of downlink beams, and determining the uplink beam for the PUCCH transmission according to the selected downlink beam, includes:

selecting one downlink beam according to the pre-configured or pre-agreed downlink beam priorities, beam group priorities or cell priorities, and determining the uplink beam for the PUCCH transmission according to the selected downlink beam; or when the PDCCH and/or PDSCH transmitted by using the downlink primary beam is received, determining the uplink beam for the PUCCH transmission according to the downlink primary beam, and/or, when the PDCCH and/or PDSCH transmission is received on the primary cell, determining the uplink beam for the PUCCH transmission according to the downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to the downlink secondary beam with the certain index used by the received PDCCH and/or PDSCH transmission, and/or, determining the uplink beam for the PUCCH transmission according to the downlink beam corresponding to the secondary cell receiving the PDCCH and/or PDSCH transmission; if there are a plurality of secondary cells, determining the uplink beam for the PUCCH transmission according to the downlink beam corresponding to the secondary cell with the certain number receiving the PDCCH and/or PDSCH transmission; where the downlink primary beam and the primary cell are pre-configured or pre-agreed; or when the PDCCH and/or PDSCH transmitted by using the downlink beam in the downlink primary beam group is received, determining the uplink primary beam corresponding to the primary beam group as the uplink beam for the PUCCH transmission, where the primary beam group and the uplink primary beam corresponding to the primary beam group are pre-configured or pre-defined; and when no PDCCH and/or PDSCH transmitted by using any downlink beam in the downlink primary beam group is received, if the PDCCH and/or PDSCH transmitted by using the downlink beam in the downlink secondary beam group is received, then determining the uplink secondary beam corresponding to the downlink secondary beam group as the uplink beam for the PUCCH transmission; and if there are a plurality of downlink secondary beam groups, then selecting one downlink secondary beam group in accordance with the priorities of the downlink secondary beam groups or the order of the index of the downlink secondary beam groups.

Third Embodiment

Figure 3:
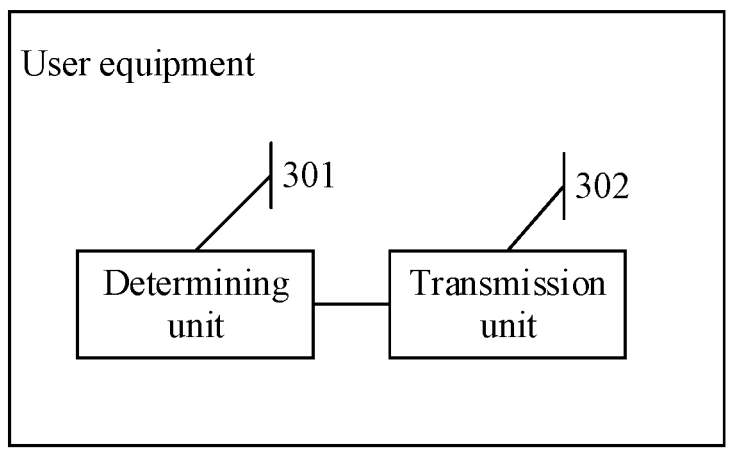
FIG. 3 is a structural block diagram of a user equipment according to an embodiment of the invention.

Referring to FIG. 3, an embodiment of the invention provides a user equipment, which includes a determining unit 301 and a transmission unit 302, where:

the determining unit 301 is configured to determine the uplink beam for the PUCCH transmission according to the downlink beam used by the PDCCH and/or PDSCH;

the transmission unit 302 is configured to perform the PUCCH transmission with the determined uplink beam.

In a possible embodiment, the PDCCH is one or a combination of: PDCCH of which ACK/NACK needs to be fed back on the PUCCH, PDCCH corresponding to PDSCH of which the ACK/NACK needs to be fed back on the PUCCH, and multicast PDCCH; and/or the PDSCH is PDSCH of which the ACK/NACK needs to be fed back on the PUCCH.

In a possible embodiment, the determining unit 301 is configured to determine the corresponding uplink Beam Pair Linkage, BPL, according to the downlink BPL corresponding to the received PDCCH and/or PDSCH, and determine the uplink beam for the PUCCH transmission or the QCL relationship between the DMRS port of the PUCCH and the port on resources of a first reference signal according to the uplink BPL, and the determining unit 301 is configured to perform the PUCCH transmission with the uplink beam corresponding to the uplink BPL; or the determining unit 301 is configured to determine the QCL relationship between the DMRS port of the PUCCH and the port on resources of a first reference signal according to the uplink BPL, and the transmission unit is configured to perform the PUCCH transmission with the QCL relationship; or the determining unit 301 is configured to determine the corresponding uplink beam index according to the downlink BPL corresponding to the received PDCCH and/or PDSCH, and the transmission unit 302 is configured to perform the PUCCH transmission with the uplink beam corresponding to the uplink beam index; or the determining unit 301 is configured to determine the QCL relationship between the DMRS port of the PUCCH and the port on resources of a first reference signal according to the downlink BPL corresponding to the received PDCCH and/or PDSCH, and the transmission unit 302 is configured to perform the PUCCH transmission with the QCL relationship; or the determining unit 301 is configured to determine the uplink beam index for identifying the uplink beam performing the PUCCH transmission according to the downlink beam index of the downlink beam corresponding to the received PDCCH and/or PDSCH, and the transmission unit 302 is configured to perform the PUCCH transmission with the uplink beam corresponding to the uplink beam index; or the determining unit 301 is configured to determine the QCL relationship between the DMRS port of the PUCCH and the port on resources of a first reference signal according to the QCL relationship between the DMRS port of the received PDCCH and/or PDSCH and the port on resources of a second reference signal, and the transmission unit 302 is configured to perform the PUCCH transmission with the QCL relationship between the DMRS port of the PUCCH and the port on resources of the first reference signal; or the determining unit 301 is configured to determine the corresponding uplink BPL according to the QCL relationship between the DMRS port of the received PDCCH and/or PDSCH and the port on resources of a second reference signal, and determine the uplink beam for the PUCCH transmission or the QCL relationship between the DMRS port of the PUCCH and the port on resources of a first reference signal according to the uplink BPL, and the transmission unit 302 is configured to perform the PUCCH transmission with the uplink beam corresponding to the uplink BPL; or the determining unit 301 is configured to determine the QCL relationship between the DMRS port of the PUCCH and the port on resources of a first reference signal according to the uplink BPL, and the transmission unit 302 is configured to perform the PUCCH transmission with the QCL relationship; or the determining unit 301 is configured to determine the corresponding uplink beam index according to the QCL relationship between the DMRS port of the received PDCCH and/or PDSCH and the port on resources of a second reference signal, and the transmission unit 302 is configured to perform the PUCCH transmission with the uplink beam corresponding to the uplink beam index.

In a possible embodiment, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible embodiment, the determining unit 301 is configured to:

determine the uplink beam corresponding to the downlink beam used by the PDCCH and/or PDSCH as the uplink beam for the PUCCH transmission according to the predetermined correspondence between one or more downlink beams and one uplink beam.

In a possible embodiment, the determining unit 301 is configured to:

when a plurality of PDCCHs and/or PDSCHs are received, different downlink beams are used for the plurality of PDCCHs and/or PDSCHs and the ACK/NACKs related to the plurality of PDCCHs and/or PDSCHs are fed back at the same time, determine a plurality of uplink beams corresponding to the plurality of downlink beams, and select one from the plurality of uplink beams as the uplink beam for the PUCCH transmission;

the transmission unit 302 is configured to:

transmit the ACK/NACKs related to the plurality of PDCCHs and/or PDSCHs on the same PUCCH with the determined uplink beam.

In a possible embodiment, the determining unit 301 is configured to:

when a plurality of PDCCHs and/or PDSCHs are received, different beams are used for the plurality of PDCCHs and/or PDSCHs and the ACK/NACKs related to the plurality of PDCCHs and/or PDSCHs are fed back at the same time, select one from the plurality of downlink beams, and determine the uplink beam for the PUCCH transmission according to the selected downlink beam;

the transmission unit 302 is configured to:

transmit the ACK/NACKs related to the plurality of PDCCHs and/or PDSCHs on the same PUCCH with the determined uplink beam.

In a possible embodiment, the determining unit 301 is configured to:

when a plurality of downlink beams and a plurality of uplink beams are divided into a plurality of groups, where there is a correspondence between downlink and uplink beams in each group, then use any one or a combination of following ways:

first way: determine a first uplink beam according to the downlink beam-x used by a received first PDCCH and/or PDSCH, and determine that the first uplink beam is used to transmit the PUCCH carrying the ACK/NACK related to the first PDCCH and/or PDSCH, where the downlink beam-x and the first uplink beam are in a same group and have a correspondence, and/or, determine a second uplink beam according to the downlink beam-y used by a received second PDCCH and/or PDSCH, and use the second uplink beam to transmit the PUCCH carrying the ACK/NACK related to the second PDCCH and/or PDSCH, where the downlink beam-y and the second uplink beam are in a same group and have a correspondence; where the ACK/NACKs related to the PDCCHs and/or PDSCHs transmitted by using different downlink beams in a same beam group are transmitted at different times;

second way: when a plurality of PDCCHs and/or PDSCHs transmitted by using different downlink beams in a same group are received and the ACK/NACKs related to the PDCCHs and/or PDSCHs are fed back at the same time, determine a plurality of uplink beams corresponding to the plurality of downlink beams in the group, and select one from the plurality of uplink beams as the uplink beam for the PUCCH transmission, where the PUCCH carries the ACK/NACKs related to the PDCCHs and/or PDSCHs;

third way: when a plurality of PDCCHs and/or PDSCHs transmitted by using different downlink beams in a same group are received and the ACK/NACKs related to the PDCCHs and/or PDSCHs are fed back at the same time, select one from the plurality of downlink beams, and determine the uplink beam for the PUCCH transmission according to the selected downlink beam, where the PUCCH carries the ACK/NACKs related to the PDCCHs and/or PDSCHs.

In a possible embodiment, the determining unit 301 is configured to:

when a plurality of downlink beams are divided into a plurality of groups where each group corresponds to one uplink primary beam for the PUCCH transmission, then:

when a first PDCCH and/or PDSCH transmitted by using the downlink beam belonging to a first group is received, determine that a first uplink primary beam corresponding to the first group is used to transmit the PUCCH carrying the ACK/NACK related to the first PDCCH and/or PDSCH, and/or, when a second PDCCH and/or PDSCH transmitted by using the downlink beam belonging to a second group is received, use a second uplink primary beam corresponding to the second group to transmit the PUCCH carrying the ACK/NACK related to the second PDCCH and/or PDSCH.

In a possible embodiment, the determining unit 301 is configured to:

select one from the plurality of uplink beams as the uplink beam for the PUCCH transmission according to the pre-configured or pre-agreed priorities of uplink beams or cells; or when the plurality of uplink beams contain a pre-configured or pre-agreed uplink primary beam, determine the uplink primary beam as the uplink beam for the PUCCH transmission; and when the at least one uplink beam does not contain the uplink primary beam, determine the secondary beam with a certain index in the at least one uplink beam as the uplink beam for the PUCCH transmission; or when there is an uplink beam corresponding to the pre-configured or pre-agreed primary cell in the plurality of uplink beams, take the uplink beam corresponding to the primary cell as the uplink beam for the PUCCH transmission; and when there is no uplink beam corresponding to the primary cell in the at least one uplink beam, take the uplink beam corresponding to the secondary cell as the uplink beam for the PUCCH transmission.

In a possible embodiment, the determining unit 301 is configured to:

select one downlink beam according to the pre-configured or pre-agreed downlink beam priorities, beam group priorities or cell priorities, and determine the uplink beam for the PUCCH transmission according to the selected downlink beam; or when the PDCCH and/or PDSCH transmitted by using the downlink primary beam is received, determine the uplink beam for the PUCCH transmission according to the downlink primary beam, and/or, when the PDCCH and/or PDSCH transmission is received on the primary cell, determine the uplink beam for the PUCCH transmission according to the downlink beam corresponding to the primary cell; and when no PDCCH and/or PDSCH transmitted by using the downlink primary beam is received or when no PDCCH and/or PDSCH transmission is received on the primary cell, determine the uplink beam for the PUCCH transmission according to the downlink secondary beam with the certain index used by the received PDCCH and/or PDSCH transmission, and/or, determine the uplink beam for the PUCCH transmission according to the downlink beam corresponding to the secondary cell receiving the PDCCH and/or PDSCH transmission; where the downlink primary beam and the primary cell are pre-configured or pre-agreed; or when the PDCCH and/or PDSCH transmitted by using the downlink beam in the downlink primary beam group is received, determine the uplink primary beam corresponding to the primary beam group as the uplink beam for the PUCCH transmission, where the primary beam group and the uplink primary beam corresponding to the primary beam group are pre-configured or pre-defined; and when no PDCCH and/or PDSCH transmitted by using any downlink beam in the downlink primary beam group is received, if the PDCCH and/or PDSCH transmitted by using the downlink beam in the downlink secondary beam group is received, then determine the uplink secondary beam corresponding to the downlink secondary beam group as the uplink beam for the PUCCH transmission; and if there are a plurality of downlink secondary beam groups, then select one downlink secondary beam group in accordance with the priorities of the downlink secondary beam groups or the order of the index of the downlink secondary beam groups.

Fourth Embodiment

An embodiment of the invention further provides a device, which includes a determining unit, where:

the determining unit is configured to determine that a terminal determines the uplink beam for the PUCCH transmission according to the downlink beam used by the PDCCH and/or PDSCH; and determine that the terminal performs the PUCCH transmission with the determined uplink beam.

In a possible embodiment, the PDCCH is one or a combination of: PDCCH of which ACK/NACK needs to be fed back on the PUCCH, PDCCH corresponding to PDSCH of which the ACK/NACK needs to be fed back on the PUCCH, and multicast PDCCH; and/or the PDSCH is PDSCH of which the ACK/NACK needs to be fed back on the PUCCH.

In a possible embodiment, the determining unit is configured to:

determine that the terminal determines the corresponding uplink Beam Pair Linkage, BPL, according to the downlink BPL corresponding to the received PDCCH and/or PDSCH, determines the uplink beam for the PUCCH transmission or the QCL relationship between the DMRS port of the PUCCH and the port on resources of a first reference signal according to the uplink BPL, and performs the PUCCH transmission with the uplink beam corresponding to the uplink BPL; or determines the QCL relationship between the DMRS port of the PUCCH and the port on resources of a first reference signal according to the uplink BPL, and performs the PUCCH transmission with the QCL relationship; or determine that the terminal determines the corresponding uplink beam index according to the downlink BPL corresponding to the received PDCCH and/or PDSCH, and determine that the terminal performs the PUCCH transmission with the uplink beam corresponding to the uplink beam index; or determine that the terminal determines the QCL relationship between the DMRS port of the PUCCH and the port on resources of a first reference signal according to the downlink BPL corresponding to the received PDCCH and/or PDSCH, and determine that the terminal performs the PUCCH transmission with the QCL relationship; or determine that the terminal determines the uplink beam index for identifying the uplink beam performing the PUCCH transmission according to the downlink beam index of the downlink beam corresponding to the received PDCCH and/or PDSCH, and determine that the terminal performs the PUCCH transmission with the uplink beam corresponding to the uplink beam index; or determine that the terminal determines the QCL relationship between the DMRS port of the PUCCH and the port on resources of a first reference signal according to the QCL relationship between the DMRS port of the received PDCCH and/or PDSCH and the port on resources of a second reference signal, and determine that the terminal performs the PUCCH transmission with the QCL relationship between the DMRS port of the PUCCH and the port on resources of the first reference signal; or determine that the terminal determines the corresponding uplink BPL according to the QCL relationship between the DMRS port of the received PDCCH and/or PDSCH and the port on resources of a second reference signal, determines the uplink beam for the PUCCH transmission or the QCL relationship between the DMRS port of the PUCCH and the port on resources of a first reference signal according to the uplink BPL, and performs the PUCCH transmission with the uplink beam corresponding to the uplink BPL; or determines the QCL relationship between the DMRS port of the PUCCH and the port on resources of a first reference signal according to the uplink BPL, and performs the PUCCH transmission with the QCL relationship; or determine that the terminal determines the corresponding uplink beam index according to the QCL relationship between the DMRS port of the received PDCCH and/or PDSCH and the port on resources of a second reference signal, and determine that the terminal performs the PUCCH transmission with the uplink beam corresponding to the uplink beam index.

In a possible embodiment, the QCL relationship between the DMRS port of the PDCCH and/or PDSCH and the port on resources of the second reference signal includes:

the DMRS port of the PDCCH and/or PDSCH and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible embodiment, the determining unit is configured to:

determine that the terminal determines the uplink beam corresponding to the downlink beam used by the PDCCH and/or PDSCH as the uplink beam for the PUCCH transmission according to the predetermined correspondence between one or more downlink beams and one uplink beam.

In a possible embodiment, the determining unit is configured to:

when a plurality of PDCCHs and/or PDSCHs are received, different downlink beams are used for the plurality of PDCCHs and/or PDSCHs and the ACK/NACKs related to the plurality of PDCCHs and/or PDSCHs are fed back at the same time, determine a plurality of uplink beams corresponding to the plurality of downlink beams, and select one from the plurality of uplink beams as the uplink beam for the PUCCH transmission;

determine that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible embodiment, the determining unit is configured to:

when a plurality of PDCCHs and/or PDSCHs are received, different beams are used for the plurality of PDCCHs and/or PDSCHs and the ACK/NACKs related to the plurality of PDCCHs and/or PDSCHs are fed back at the same time, select one from the plurality of downlink beams, and determine the uplink beam for the PUCCH transmission according to the selected downlink beam;

determine that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible embodiment, the determining unit is configured to:

when a plurality of downlink beams and a plurality of uplink beams are divided into a plurality of groups, where there is a correspondence between downlink and uplink beams in each group, then:

first way: determine a first uplink beam according to the downlink beam-x used for a received first PDCCH and/or PDSCH, and determine that the first uplink beam is used to transmit the PUCCH carrying the ACK/NACK related to the first PDCCH and/or PDSCH, where the downlink beam-x and the first uplink beam are in a same group and have a correspondence, and/or, determine a second uplink beam according to the downlink beam-y used by a received second PDCCH and/or PDSCH, and use the second uplink beam to transmit the PUCCH carrying the ACK/NACK related to the second PDCCH and/or PDSCH, where the downlink beam-y and the second uplink beam are in a same group and have a correspondence; where the ACK/NACKs related to the PDCCHs and/or PDSCHs transmitted by different downlink beams in a same beam group are transmitted at different times;

second way: when a plurality of PDCCHs and/or PDSCHs transmitted by using different downlink beams in a same group are received and the ACK/NACKs related to the PDCCHs and/or PDSCHs are fed back at the same time, determine a plurality of uplink beams corresponding to the plurality of downlink beams in the group, and select one from the plurality of uplink beams as the uplink beam for the PUCCH transmission, where the PUCCH carries the ACK/NACKs related to the PDCCHs and/or PDSCHs;

third way: when a plurality of PDCCHs and/or PDSCHs transmitted by using different downlink beams in a same group are received and the ACK/NACKs related to the PDCCHs and/or PDSCHs are fed back at the same time, select one from the plurality of downlink beams, and determine the uplink beam for the PUCCH transmission according to the selected downlink beam, where the PUCCH carries the ACK/NACKs related to the PDCCHs and/or PDSCHs.

In a possible embodiment, the determining unit is configured to:

when a plurality of downlink beams are divided into a plurality of groups where each group corresponds to one uplink primary beam for the PUCCH transmission, then:

when a first PDCCH and/or PDSCH transmitted by using the downlink beam belonging to a first group is received, determine that a first uplink primary beam corresponding to the first group is used to transmit the PUCCH carrying the ACK/NACK related to the first PDCCH and/or PDSCH, and/or, when a second PDCCH and/or PDSCH transmitted by using the downlink beam belonging to a second group is received, use a second uplink primary beam corresponding to the second group to transmit the PUCCH carrying the ACK/NACK related to the second PDCCH and/or PDSCH.

In a possible embodiment, the determining unit is configured to:

select one from the plurality of uplink beams as the uplink beam for the PUCCH transmission according to the pre-configured or pre-agreed priorities of uplink beams or cells; or when the plurality of uplink beams contain a pre-configured or pre-agreed uplink primary beam, determine the uplink primary beam as the uplink beam for the PUCCH transmission; and when the at least one uplink beam does not contain the uplink primary beam, determine a secondary beam with a certain index in the at least one uplink beam as the uplink beam for the PUCCH transmission; or when there is the uplink beam corresponding to the pre-configured or pre-agreed primary cell in the plurality of uplink beams, take the uplink beam corresponding to the primary cell as the uplink beam for the PUCCH transmission; and when there is no uplink beam corresponding to the primary cell in the at least one uplink beam, take the uplink beam corresponding to the secondary cell as the uplink beam for the PUCCH transmission.

In a possible embodiment, the determining unit is configured to:

select one downlink beam according to the pre-configured or pre-agreed downlink beam priorities, beam group priorities or cell priorities, and determining the uplink beam for the PUCCH transmission according to the selected downlink beam; or when the PDCCH and/or PDSCH transmitted by using the downlink primary beam is received, determine the uplink beam for the PUCCH transmission according to the downlink primary beam, and/or, when the PDCCH and/or PDSCH transmission is received on the primary cell, determine the uplink beam for the PUCCH transmission according to the downlink beam corresponding to the primary cell; and when no PDCCH and/or PDSCH transmitted by using the downlink primary beam is received or when no PDCCH and/or PDSCH transmission is received on the primary cell, determine the uplink beam for the PUCCH transmission according to the downlink secondary beam with the certain index used by the received PDCCH and/or PDSCH transmission, and/or, determine the uplink beam for the PUCCH transmission according to the downlink beam corresponding to the secondary cell receiving the PDCCH and/or PDSCH transmission; if there are a plurality of secondary cells, determine the uplink beam for the PUCCH transmission according to the downlink beam corresponding to the secondary cell with the certain number receiving the PDCCH and/or PDSCH transmission; where the downlink primary beam and the primary cell are pre-configured or pre-agreed; or when the PDCCH and/or PDSCH transmitted by using the downlink beam in the downlink primary beam group is received, determine the uplink primary beam corresponding to the primary beam group as the uplink beam for the PUCCH transmission, where the primary beam group and the uplink primary beam corresponding to the primary beam group are pre-configured or pre-defined; and when no PDCCH and/or PDSCH transmitted by using any downlink beam in the downlink primary beam group is received, if the PDCCH and/or PDSCH transmitted by using the downlink beam in the downlink secondary beam group is received, then determine the uplink secondary beam corresponding to the downlink secondary beam group as the uplink beam for the PUCCH transmission; and if there are a plurality of downlink secondary beam groups, then select one downlink secondary beam group in accordance with the priorities of the downlink secondary beam groups or the order of the index of the downlink secondary beam groups.

Fifth Embodiment

Figure 4:
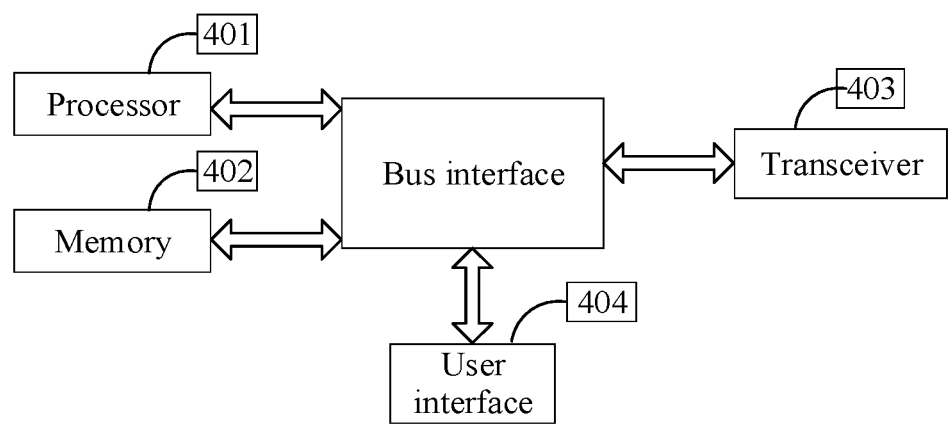
FIG. 4 is a structural schematic diagram of a user equipment according to an embodiment of the invention.

Referring to FIG. 4, an embodiment of the invention provides another user equipment, which includes a processor 401, and a memory 402 and a transceiver 403 connected with the processor 401.

Here, in FIG. 4, the bus architecture can include any numbers of interconnected buses and bridges, and specifically link various circuits of one or more processors represented by the processor 401 and the memory represented by the memory 402. The bus architecture can further link various other circuits such as peripheral device, voltage regulator and power management circuit, which are all well known in the art and thus will not be further described again herein. The bus interface provides an interface. The transceiver 403 can be a plurality of elements, i.e., include a transmitter and a receiver, and provide the units for communicating with various other devices over the transmission media. For different user equipments, the user interface 404 can also be the interface capable of inter-connecting or connecting externally with the required devices, and the connected devices include but not limited to keypad, display, loudspeaker, microphone, joystick and the like.

The processor 401 is responsible for managing the bus architecture and general processing, and the memory 402 can store the data used by the processor 401 when performing the operations.

The processor 401 is configured to read the programs in the memory 402 to perform the process of:

determining the uplink beam for the PUCCH transmission according to the downlink beam used by the PDCCH and/or PDSCH;

controlling the transceiver 403 to perform the PUCCH transmission with the determined uplink beam.

In a possible embodiment, the PDCCH is one or a combination of: PDCCH of which ACK/NACK needs to be fed back on the PUCCH, PDCCH corresponding to PDSCH of which the ACK/NACK needs to be fed back on the PUCCH, and multicast PDCCH; and/or the PDSCH is PDSCH of which the ACK/NACK needs to be fed back on the PUCCH.

In a possible embodiment, the corresponding uplink Beam Pair Linkage, BPL, is determined according to the downlink BPL corresponding to the received PDCCH and/or PDSCH, the uplink beam for the PUCCH transmission or the QCL relationship between the DMRS port of the PUCCH and the port on resources of a first reference signal is determined according to the uplink BPL, and the transceiver 403 is controlled to perform the PUCCH transmission with the uplink beam corresponding to the uplink BPL; or the QCL relationship between the DMRS port of the PUCCH and the port on resources of a first reference signal is determined according to the uplink BPL, and the transceiver 403 is controlled to perform the PUCCH transmission with the QCL relationship; or the corresponding uplink beam index is determined according to the downlink BPL corresponding to the received PDCCH and/or PDSCH, and the transceiver 403 is controlled to perform the PUCCH transmission with the uplink beam corresponding to the uplink beam index; or the QCL relationship between the DMRS port of the PUCCH and the port on resources of a first reference signal is determined according to the downlink BPL corresponding to the received PDCCH and/or PDSCH, and the transceiver 403 is controlled to perform the PUCCH transmission with the QCL relationship; or the uplink beam index for identifying the uplink beam performing the PUCCH transmission is determined according to the downlink beam index of the downlink beam corresponding to the received PDCCH and/or PDSCH, and the transceiver 403 is controlled to perform the PUCCH transmission with the uplink beam corresponding to the uplink beam index; or the QCL relationship between the DMRS port of the PUCCH and the port on resources of a first reference signal is determined according to the QCL relationship between the DMRS port of the received PDCCH and/or PDSCH and the port on resources of a second reference signal, and the transceiver 403 is controlled to perform the PUCCH transmission with the QCL relationship between the DMRS port of the PUCCH and the port on resources of the first reference signal; or the corresponding uplink BPL is determined according to the QCL relationship between the DMRS port of the received PDCCH and/or PDSCH and the port on resources of a second reference signal, the uplink beam for the PUCCH transmission or the QCL relationship between the DMRS port of the PUCCH and the port on resources of a first reference signal is determined according to the uplink BPL, and the transceiver 403 is controlled to perform the PUCCH transmission with the uplink beam corresponding to the uplink BPL; or the QCL relationship between the DMRS port of the PUCCH and the port on resources of a first reference signal is determined according to the uplink BPL, and the transceiver 403 is controlled to perform the PUCCH transmission with the QCL relationship; or the corresponding uplink beam index is determined according to the QCL relationship between the DMRS port of the received PDCCH and/or PDSCH and the port on resources of a second reference signal, and the transceiver 403 is controlled to perform the PUCCH transmission with the uplink beam corresponding to the uplink beam index.

In a possible embodiment, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible embodiment, determining the uplink beam for the PUCCH transmission according to the downlink beam used by the PDCCH and/or PDSCH, includes:

determining the uplink beam corresponding to the downlink beam used by the PDCCH and/or PDSCH as the uplink beam for the PUCCH transmission according to the predetermined correspondence between one or more downlink beams and one uplink beam.

In a possible embodiment, determining the uplink beam for the PUCCH transmission according to the downlink beam used by the PDCCH and/or PDSCH, includes:

when a plurality of PDCCHs and/or PDSCHs are received, different downlink beams are used for the plurality of PDCCHs and/or PDSCHs and the ACK/NACKs related to the plurality of PDCCHs and/or PDSCHs are fed back at the same time, determining a plurality of uplink beams corresponding to the plurality of downlink beams, and selecting one from the plurality of uplink beams as the uplink beam for the PUCCH transmission;

controlling the transceiver 403 to perform the PUCCH transmission with the determined uplink beam, includes:

controlling the transceiver 403 to transmit the ACK/NACKs related to the plurality of PDCCHs and/or PDSCHs on the same PUCCH with the determined uplink beam.

In a possible embodiment, determining the uplink beam for the PUCCH transmission according to the downlink beam used by the PDCCH and/or PDSCH, includes:

when a plurality of PDCCHs and/or PDSCHs are received, different beams are used for the plurality of PDCCHs and/or PDSCHs and the ACK/NACKs related to the plurality of PDCCHs and/or PDSCHs are fed back at the same time, selecting one from the plurality of downlink beams, and controlling the transceiver 403 to determine the uplink beam for the PUCCH transmission according to the selected downlink beam;

controlling the transceiver 403 to perform the PUCCH transmission with the determined uplink beam, includes:

controlling the transceiver 403 to transmit the ACK/NACKs related to the plurality of PDCCHs and/or PDSCHs on the same PUCCH with the determined uplink beam.

In a possible embodiment, determining the uplink beam for the PUCCH transmission according to the downlink beam used by the PDCCH and/or PDSCH, includes:

when a plurality of downlink beams and a plurality of uplink beams are divided into a plurality of groups, where there is a correspondence between downlink and uplink beams in each group, then using any one or a combination of following ways:

first way: determining a first uplink beam according to the downlink beam-x used for a received first PDCCH and/or PDSCH, and determining that the first uplink beam is used to transmit the PUCCH carrying the ACK/NACK related to the first PDCCH and/or PDSCH, where the downlink beam-x and the first uplink beam are in a same group and have a correspondence, and/or, determining a second uplink beam according to the downlink beam-y used by a received second PDCCH and/or PDSCH, and using the second uplink beam to transmit the PUCCH carrying the ACK/NACK related to the second PDCCH and/or PDSCH, where the downlink beam-y and the second uplink beam are in a same group and have a correspondence; where the ACK/NACKs related to the PDCCHs and/or PDSCHs transmitted by different downlink beams in a same beam group are transmitted at different times;

second way: when a plurality of PDCCHs and/or PDSCHs transmitted by using different downlink beams in a same group are received and the ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, where the PUCCH carries the ACK/NACKs related to the PDCCHs and/or PDSCHs;

third way: when a plurality of PDCCHs and/or PDSCHs transmitted by using different downlink beams in a same group are received and the ACK/NACKs related to the PDCCHs and/or PDSCHs are fed back at the same time, selecting one from the plurality of downlink beams, and determining the uplink beam for the PUCCH transmission according to the selected downlink beam, where the PUCCH carries the ACK/NACKs related to the PDCCHs and/or PDSCHs.

In a possible embodiment, determining the uplink beam for the PUCCH transmission according to the downlink beam used by the PDCCH and/or PDSCH, includes:

when a plurality of downlink beams are divided into a plurality of groups where each group corresponds to one uplink primary beam for the PUCCH transmission, then:

when a first PDCCH and/or PDSCH transmitted by using the downlink beam belonging to a first group is received, determining that a first uplink primary beam corresponding to the first group is used to transmit the PUCCH carrying the ACK/NACK related to the first PDCCH and/or PDSCH, and/or, when a second PDCCH and/or PDSCH transmitted by using the downlink beam belonging to a second group is received, using a second uplink primary beam corresponding to the second group to transmit the PUCCH carrying the ACK/NACK related to the second PDCCH and/or PDSCH.

In a possible embodiment, selecting one from the plurality of uplink beams as the uplink beam for the PUCCH transmission, includes:

selecting one from the plurality of uplink beams as the uplink beam for the PUCCH transmission according to the pre-configured or pre-agreed priorities of the uplink beams or cells; or when the plurality of uplink beams contain a pre-configured or pre-agreed uplink primary beam, determining the uplink primary beam as the uplink beam for the PUCCH transmission; and when the at least one uplink beam does not contain the uplink primary beam, determining a secondary beam with a certain index in the at least one uplink beam as the uplink beam for the PUCCH transmission; or when there is the uplink beam corresponding to the pre-configured or pre-agreed primary cell in the plurality of uplink beams, taking the uplink beam corresponding to the primary cell as the uplink beam for the PUCCH transmission; and when there is no uplink beam corresponding to the primary cell in the at least one uplink beam, taking the uplink beam corresponding to the secondary cell as the uplink beam for the PUCCH transmission.

In a possible embodiment, selecting one from the plurality of downlink beams, and determining the uplink beam for the PUCCH transmission according to the selected downlink beam, includes:

selecting one downlink beam according to the pre-configured or pre-agreed downlink beam priorities, beam group priorities or cell priorities, and determining the uplink beam for the PUCCH transmission according to the selected downlink beam; or when the PDCCH and/or PDSCH transmitted by using the downlink primary beam is received, determining the uplink beam for the PUCCH transmission according to the downlink primary beam, and/or, when the PDCCH and/or PDSCH transmission is received on the primary cell, determining the uplink beam for the PUCCH transmission according to the downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to the downlink secondary beam with the certain index used by the received PDCCH and/or PDSCH transmission, and/or, determining the uplink beam for the PUCCH transmission according to the downlink beam corresponding to the secondary cell receiving the PDCCH and/or PDSCH transmission; if there are a plurality of secondary cells, determining the uplink beam for the PUCCH transmission according to the downlink beam corresponding to the secondary cell with the certain number receiving the PDCCH and/or PDSCH transmission; where the downlink primary beam and the primary cell are pre-configured or pre-agreed; or when the PDCCH and/or PDSCH transmitted by using the downlink beam in the downlink primary beam group is received, determining the uplink primary beam corresponding to the primary beam group as the uplink beam for the PUCCH transmission, where the primary beam group and the uplink primary beam corresponding to the primary beam group are pre-configured or pre-defined; and when no PDCCH and/or PDSCH transmitted by using any downlink beam in the downlink primary beam group is received, if the PDCCH and/or PDSCH transmitted by using the downlink beam in the downlink secondary beam group is received, then determining the uplink secondary beam corresponding to the downlink secondary beam group as the uplink beam for the PUCCH transmission; and if there are a plurality of downlink secondary beam groups, then selecting one downlink secondary beam group in accordance with the priorities of the downlink secondary beam groups or the order of the index of the downlink secondary beam groups.

Sixth Embodiment

Figure 5:
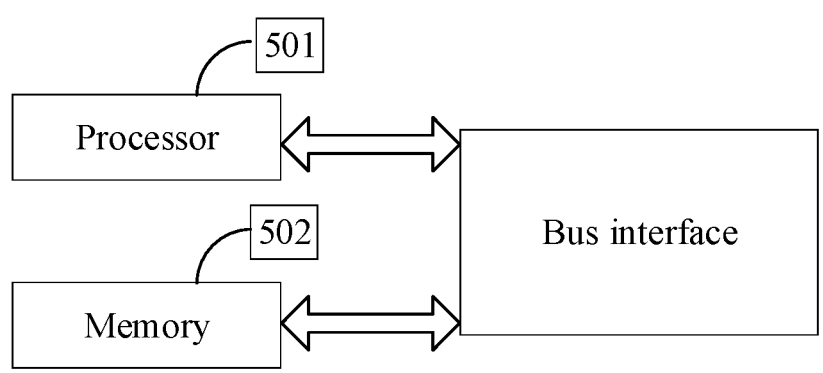
FIG. 5 is a structural schematic diagram of a device according to an embodiment of the invention.
Figure 6:
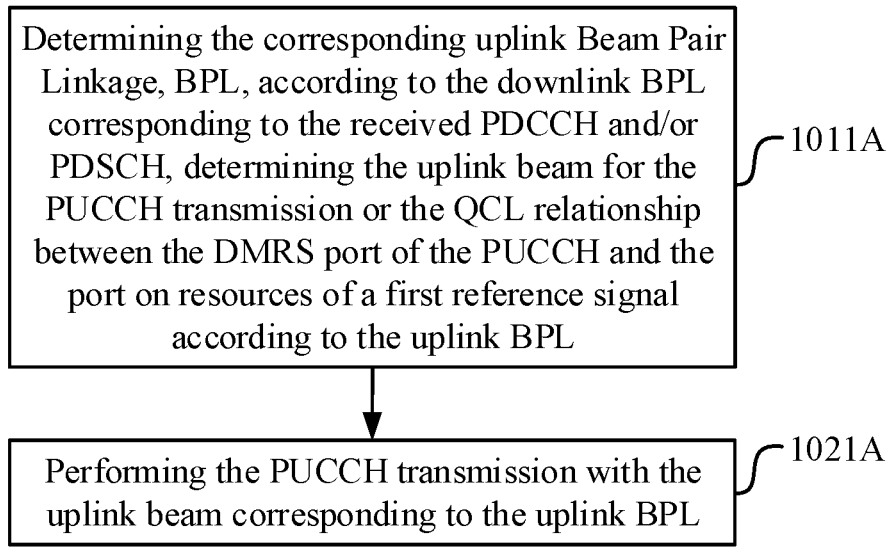
FIGS. 6-14 each is a flow chart of a PUCCH transmission method in an example embodiment of the invention.
Figure 7:
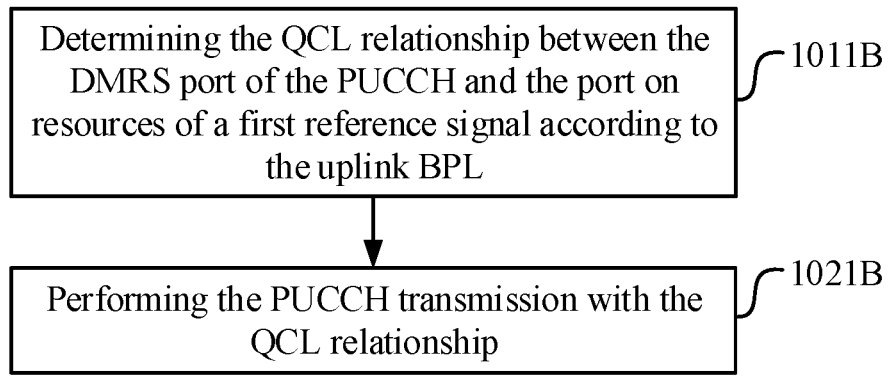
Figure 8:
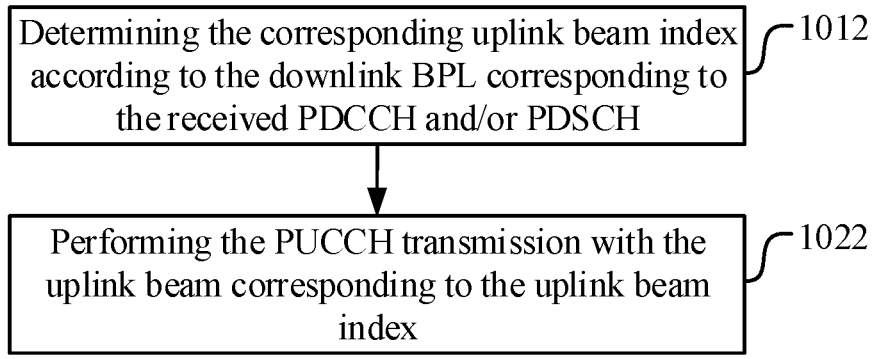
Figure 9:
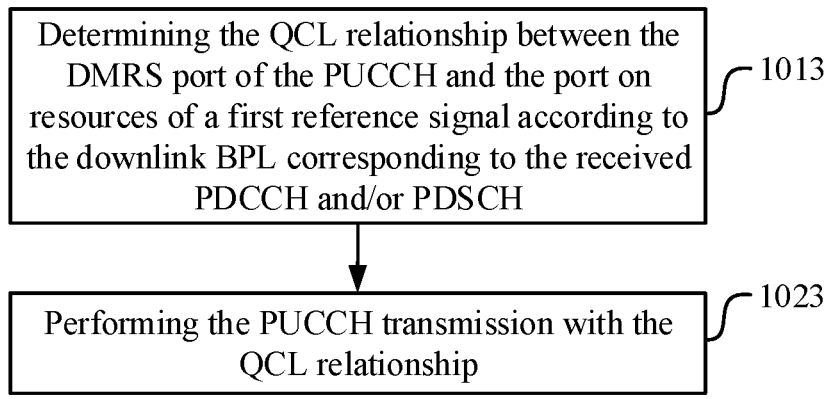
Figure 10:
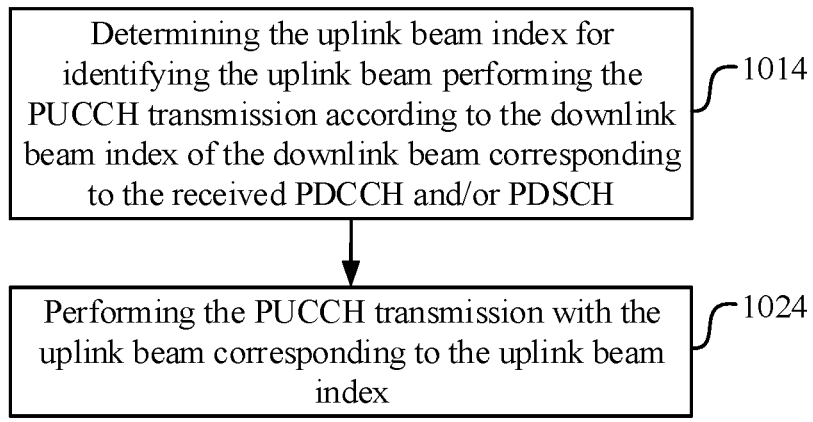
Figure 11:
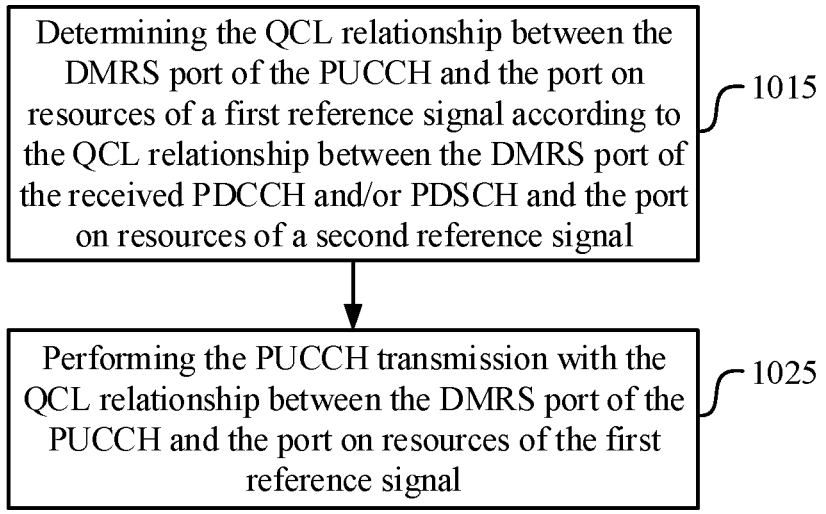
Figure 12:
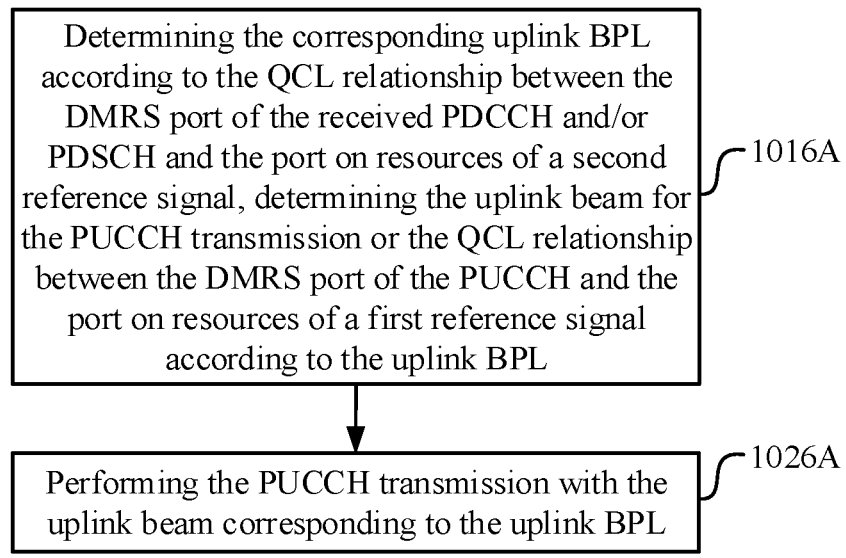
Figure 13:
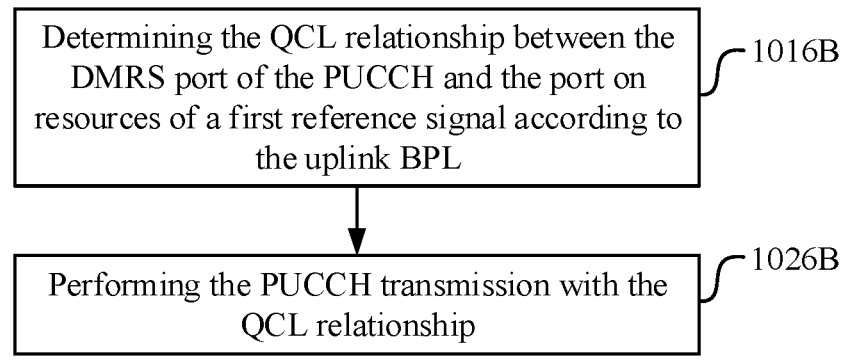
Figure 14:
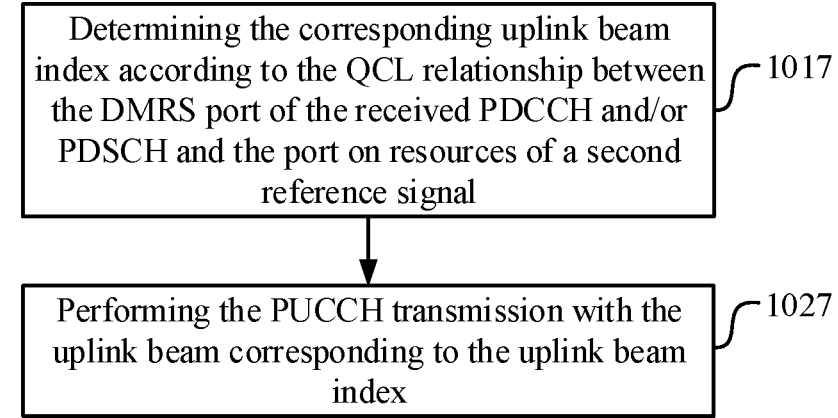
Figure 15:
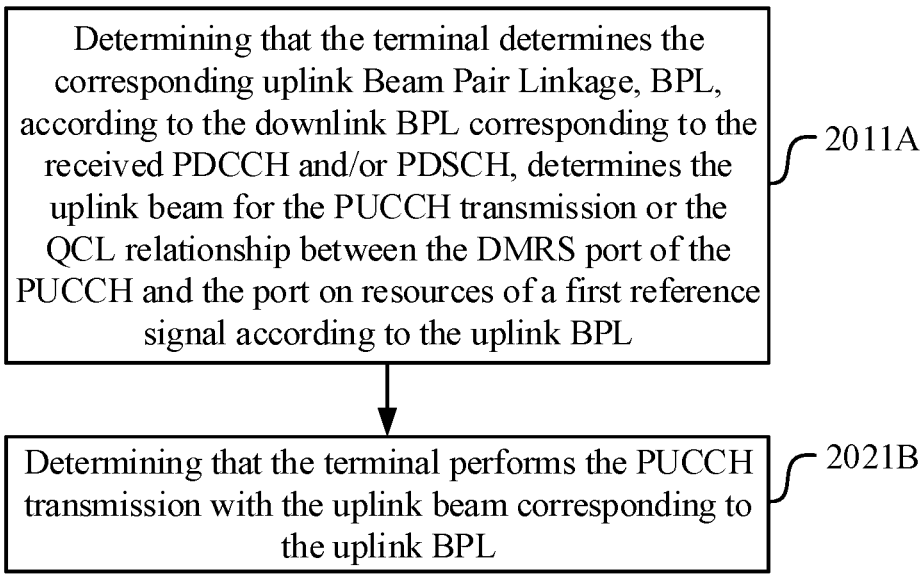
FIGS. 15-23 each is a flow chart of another PUCCH transmission method according to an example embodiment of the invention.
Figure 16:
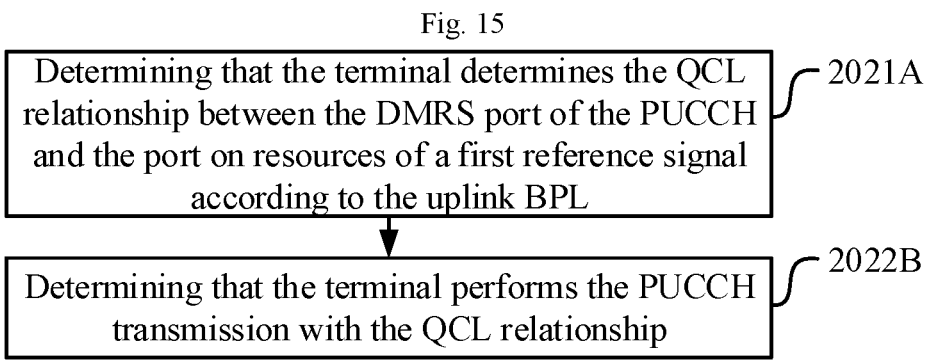
Figure 17:
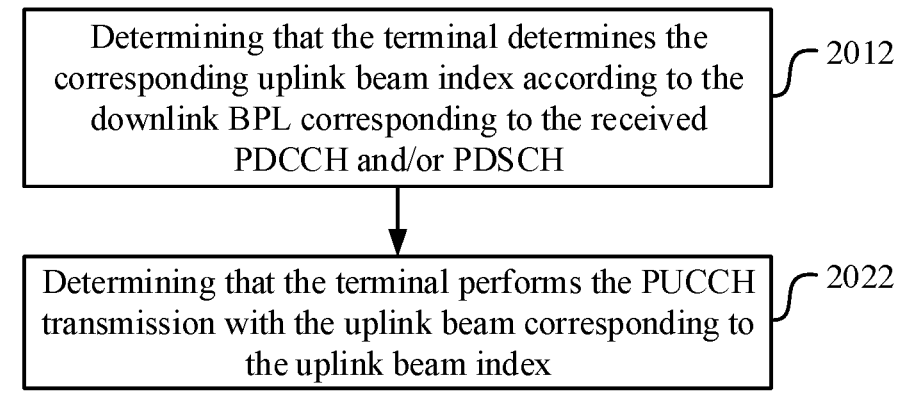
Figure 18:
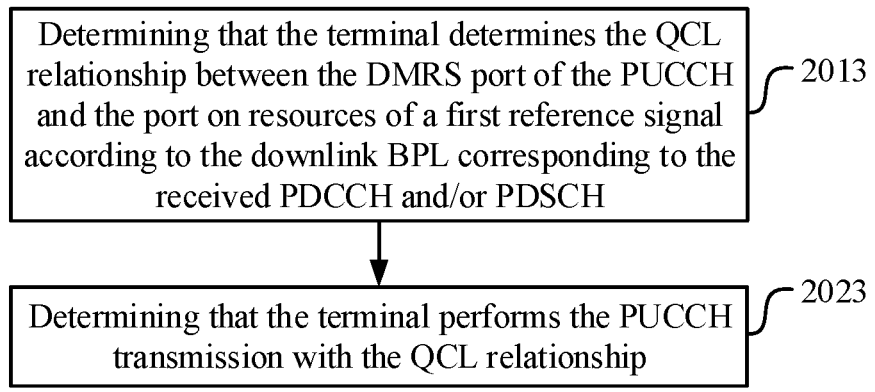
Figure 19:
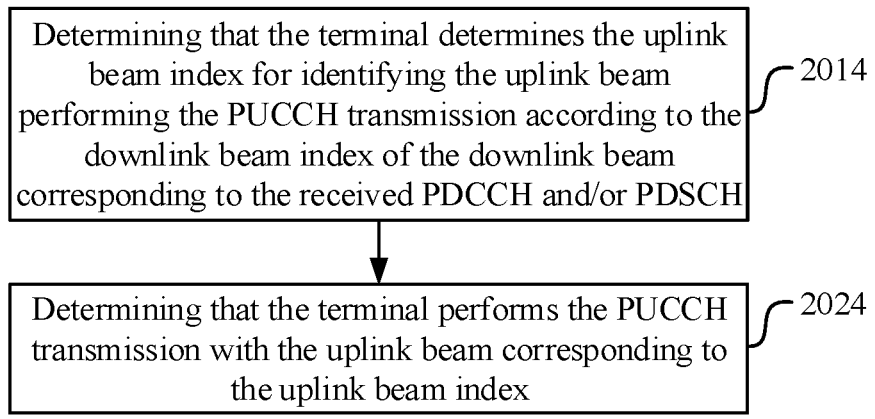
Figure 20:
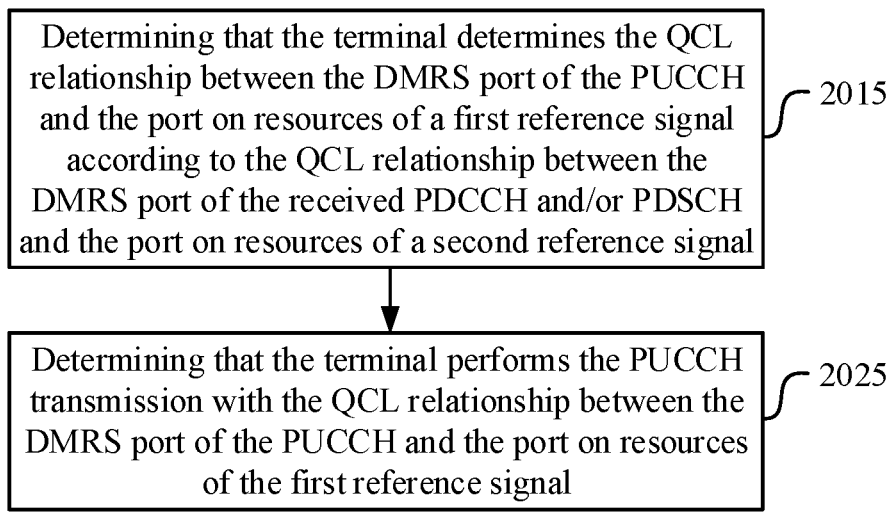
Figure 21:
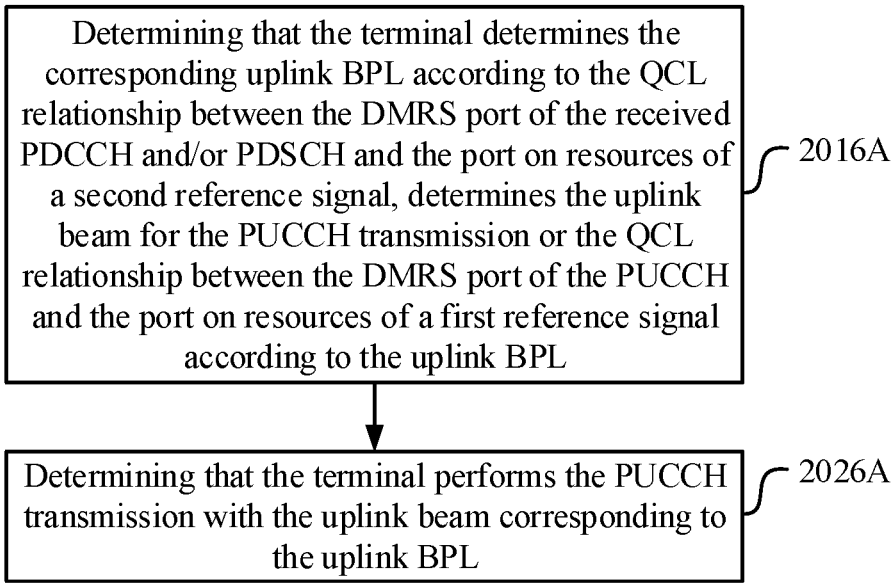
Figure 22:
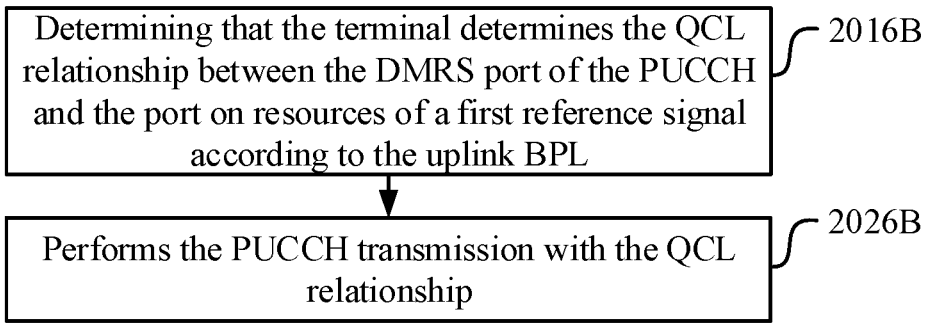
Figure 23:
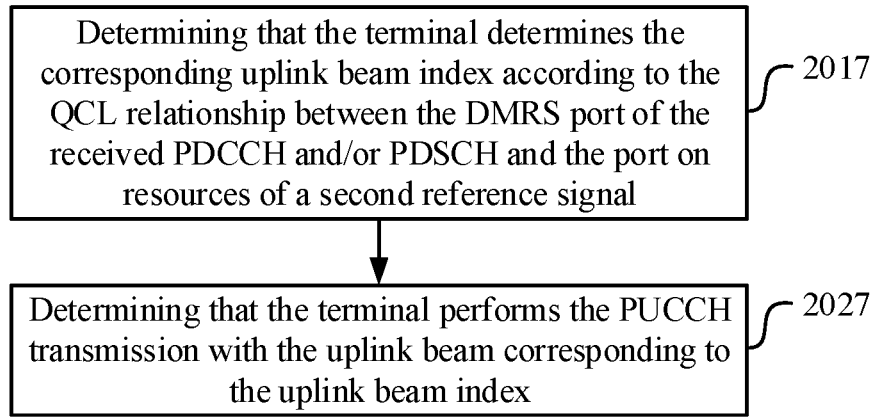

Referring to FIG. 5, an embodiment of the invention provides another device which includes a processor 501 and a memory 502 connected with the processor.

Here, in FIG. 5, the bus architecture can include any numbers of interconnected buses and bridges, and specifically link various circuits of one or more processors represented by the processor 501 and the memory represented by the memory 502. The bus architecture can further link various other circuits such as peripheral device, voltage regulator and power management circuit, which are all well known in the art and thus will not be further described again herein. The bus interface provides an interface. The processor 501 is responsible for managing the bus architecture and general processing, and the memory 502 can store the data used by the processor 501 when performing the operations.

The processor 501 is configured to read the programs in the memory 502 to perform the process of:

determining that a terminal determines the uplink beam for the PUCCH transmission according to the downlink beam used by the PDCCH and/or PDSCH;

determining that the terminal performs the PUCCH transmission with the determined uplink beam.

In a possible embodiment, the PDCCH is one or a combination of: PDCCH of which ACK/NACK needs to be fed back on the PUCCH, PDCCH corresponding to PDSCH of which the ACK/NACK needs to be fed back on the PUCCH, and multicast PDCCH; and/or the PDSCH is PDSCH of which the ACK/NACK needs to be fed back on the PUCCH.

In a possible embodiment, determining that the terminal determines the uplink beam for the PUCCH transmission according to the downlink beam used by the PDCCH and/or PDSCH, and performs the PUCCH transmission with the determined uplink beam, includes:

determining that the terminal determines the corresponding uplink Beam Pair Linkage, BPL, according to the downlink BPL corresponding to the received PDCCH and/or PDSCH, determines the uplink beam for the PUCCH transmission or the QCL relationship between the DMRS port of the PUCCH and the port on resources of a first reference signal according to the uplink BPL, and performs the PUCCH transmission with the uplink beam corresponding to the uplink BPL; or determines the QCL relationship between the DMRS port of the PUCCH and the port on resources of a first reference signal according to the uplink BPL, and performs the PUCCH transmission with the QCL relationship; or determining that the terminal determines the corresponding uplink beam index according to the downlink BPL corresponding to the received PDCCH and/or PDSCH, and determining that the terminal performs the PUCCH transmission with the uplink beam corresponding to the uplink beam index; or determining that the terminal determines the QCL relationship between the DMRS port of the PUCCH and the port on resources of a first reference signal according to the downlink BPL corresponding to the received PDCCH and/or PDSCH, and determining that the terminal performs the PUCCH transmission with the QCL relationship; or determining that the terminal determines the uplink beam index for identifying the uplink beam performing the PUCCH transmission according to the downlink beam index of the downlink beam corresponding to the received PDCCH and/or PDSCH, and determining that the terminal performs the PUCCH transmission with the uplink beam corresponding to the uplink beam index; or determining that the terminal determines the QCL relationship between the DMRS port of the PUCCH and the port on resources of a first reference signal according to the QCL relationship between the DMRS port of the received PDCCH and/or PDSCH and the port on resources of a second reference signal, and determining that the terminal performs the PUCCH transmission with the QCL relationship between the DMRS port of the PUCCH and the port on resources of the first reference signal; or determining that the terminal determines the corresponding uplink BPL according to the QCL relationship between the DMRS port of the received PDCCH and/or PDSCH and the port on resources of a second reference signal, determines the uplink beam for the PUCCH transmission or the QCL relationship between the DMRS port of the PUCCH and the port on resources of a first reference signal according to the uplink BPL, and performs the PUCCH transmission with the uplink beam corresponding to the uplink BPL; or determines the QCL relationship between the DMRS port of the PUCCH and the port on resources of a first reference signal according to the uplink BPL, and performs the PUCCH transmission with the QCL relationship; or determining that the terminal determines the corresponding uplink beam index according to the QCL relationship between the DMRS port of the received PDCCH and/or PDSCH and the port on resources of a second reference signal, and determining that the terminal performs the PUCCH transmission with the uplink beam corresponding to the uplink beam index.

In a possible embodiment, the QCL relationship between the DMRS port of the PDCCH and/or PDSCH and the port on resources of the second reference signal includes:

the DMRS port of the PDCCH and/or PDSCH, and all ports or a specified port on resources of a configured second reference signal are of QCL; or the QCL relationship between the DMRS port of the PUCCH and the port on resources of the first reference signal includes:

the DMRS port of the PUCCH and all ports or a specified port on resources of a configured first reference signal are of QCL.

In a possible embodiment, determining that the terminal determines the uplink beam for the PUCCH transmission according to the downlink beam used by the PDCCH and/or PDSCH, includes:

determining that the terminal determines the uplink beam corresponding to the downlink beam used by the PDCCH and/or PDSCH as the uplink beam for the PUCCH transmission according to the predetermined correspondence between one or more downlink beams and one uplink beam.

In a possible embodiment, determining that the terminal determines the uplink beam for the PUCCH transmission according to the downlink beam used by the PDCCH and/or PDSCH in accordance with the process of:

when a plurality of PDCCHs and/or PDSCHs are received and different downlink beams are used for the plurality of PDCCHs and/or PDSCHs and the ACK/NACKs related to the plurality of PDCCHs and/or PDSCHs are fed back at the same time, determining a plurality of uplink beams corresponding to the plurality of downlink beams, and selecting one from the plurality of uplink beams as the uplink beam for the PUCCH transmission;

determining that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible embodiment, determining that the terminal determines the uplink beam for the PUCCH transmission according to the downlink beam used by the PDCCH and/or PDSCH in accordance with the process of:

when a plurality of PDCCHs and/or PDSCHs are received, different beams are used for the plurality of PDCCHs and/or PDSCHs and the ACK/NACKs related to the plurality of PDCCHs and/or PDSCHs are fed back at the same time, selecting one from the plurality of downlink beams, and determining the uplink beam for the PUCCH transmission according to the selected downlink beam;

determining that the terminal performs the PUCCH transmission with the determined uplink beam in accordance with the process of:

transmitting the ACK/NACKs related to the plurality of PDCCHs and/or PDSCHs on the same PUCCH with the determined uplink beam.

In a possible embodiment, determining that the terminal determines the uplink beam for the PUCCH transmission according to the downlink beam used by the PDCCH and/or PDSCH in accordance with the process of:

when a plurality of downlink beams and a plurality of uplink beams are divided into a plurality of groups, where there is a correspondence between downlink and uplink beams in each group, then using any one or a combination of following ways:

first way: determining a first uplink beam according to the downlink beam-x used for a received first PDCCH and/or PDSCH, and determining that the first uplink beam is used to transmit the PUCCH carrying the ACK/NACK related to the first PDCCH and/or PDSCH, where the downlink beam-x and the first uplink beam are in a same group and have a correspondence, and/or, determining a second uplink beam according to the downlink beam-y used by a received second PDCCH and/or PDSCH, and using the second uplink beam to transmit the PUCCH carrying the ACK/NACK related to the second PDCCH and/or PDSCH, where the downlink beam-y and the second uplink beam are in a same group and have a correspondence; where the ACK/NACKs related to the PDCCHs and/or PDSCHs transmitted by different downlink beams in a same beam group are transmitted at different times;

second way: when a plurality of PDCCHs and/or PDSCHs transmitted by using different downlink beams in a same group are received and the ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, where the PUCCH carries the ACK/NACKs related to the PDCCHs and/or PDSCHs;

third way: when a plurality of PDCCHs and/or PDSCHs transmitted by using different downlink beams in a same group are received and the ACK/NACKs related to the PDCCHs and/or PDSCHs are fed back at the same time, selecting one from the plurality of downlink beams, and determining the uplink beam for the PUCCH transmission according to the selected downlink beam, where the PUCCH carries the ACK/NACKs related to the PDCCHs and/or PDSCHs.

In a possible embodiment, determining that the terminal determines the uplink beam for the PUCCH transmission according to the downlink beam used by the PDCCH and/or PDSCH in accordance with the process of:

when a plurality of downlink beams are divided into a plurality of groups where each group corresponds to one uplink primary beam for the PUCCH transmission, then:

when a first PDCCH and/or PDSCH transmitted by using the downlink beam belonging to a first group is received, determining that a first uplink primary beam corresponding to the first group is used to transmit the PUCCH carrying the ACK/NACK related to the first PDCCH and/or PDSCH, and/or, when a second PDCCH and/or PDSCH transmitted by using the downlink beam belonging to a second group is received, using a second uplink primary beam corresponding to the second group to transmit the PUCCH carrying the ACK/NACK related to the second PDCCH and/or PDSCH.

In a possible embodiment, selecting one from the plurality of uplink beams as the uplink beam for the PUCCH transmission, includes:

selecting one from the plurality of uplink beams as the uplink beam for the PUCCH transmission according to the pre-configured or pre-agreed priorities of uplink beams or cells; or when the plurality of uplink beams contain a pre-configured or pre-agreed uplink primary beam, determining the uplink primary beam as the uplink beam for the PUCCH transmission; and when the at least one uplink beam does not contain the uplink primary beam, determining a secondary beam with a certain index in the at least one uplink beam as the uplink beam for the PUCCH transmission; or when there is the uplink beam corresponding to the pre-configured or pre-agreed primary cell in the plurality of uplink beams, taking the uplink beam corresponding to the primary cell as the uplink beam for the PUCCH transmission; and when there is no uplink beam corresponding to the primary cell in the at least one uplink beam, taking the uplink beam corresponding to the secondary cell as the uplink beam for the PUCCH transmission.

In a possible embodiment, selecting one from the plurality of downlink beams, and determining the uplink beam for the PUCCH transmission according to the selected downlink beam, includes:

selecting one downlink beam according to the pre-configured or pre-agreed downlink beam priorities, beam group priorities or cell priorities, and determining the uplink beam for the PUCCH transmission according to the selected downlink beam; or when the PDCCH and/or PDSCH transmitted by using the downlink primary beam is received, determining the uplink beam for the PUCCH transmission according to the downlink primary beam, and/or, when the PDCCH and/or PDSCH transmission is received on the primary cell, determining the uplink beam for the PUCCH transmission according to the downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to the downlink secondary beam with the certain index used by the received PDCCH and/or PDSCH transmission, and/or, determining the uplink beam for the PUCCH transmission according to the downlink beam corresponding to the secondary cell receiving the PDCCH and/or PDSCH transmission; if there are a plurality of secondary cells, determining the uplink beam for the PUCCH transmission according to the downlink beam corresponding to the secondary cell with the certain number receiving the PDCCH and/or PDSCH transmission; where the downlink primary beam and the primary cell are pre-configured or pre-agreed; or when the PDCCH and/or PDSCH transmitted by using the downlink beam in the downlink primary beam group is received, determining the uplink primary beam corresponding to the primary beam group as the uplink beam for the PUCCH transmission, where the primary beam group and the uplink primary beam corresponding to the primary beam group are pre-configured or pre-defined; and when no PDCCH and/or PDSCH transmitted by using any downlink beam in the downlink primary beam group is received, if the PDCCH and/or PDSCH transmitted by using the downlink beam in the downlink secondary beam group is received, then determining the uplink secondary beam corresponding to the downlink secondary beam group as the uplink beam for the PUCCH transmission; and if there are a plurality of downlink secondary beam groups, then selecting one downlink secondary beam group in accordance with the priorities of the downlink secondary beam groups or the order of the index of the downlink secondary beam groups.

Seventh Embodiment

It is assumed that there are downlink beams 1-4 and uplink beams 1-4, and there is a linkage between the downlink beams 1-4 and uplink beams 1-4 respectively (i.e., reciprocity, where all the beams may correspond to the same TRP, or the beams 1 and 2 are set as one group (corresponding to TRP1) and the beams 3 and 4 are set as one group (corresponding to TRP2)), and the terminal is configured to use a certain downlink beam (for example, downlink beams 1 and 4) to receive the PDCCH.

There is a case that: when only the PDCCH using the beam 1 is received, the uplink beam 1 is determined directly according to the linkage, and the PDCCH is transmitted in accordance with the determined uplink beam; when only the PDCCH using the beam 4 is received, the uplink beam 4 is determined directly according to the linkage, and the PDCCH is transmitted in accordance with the determined uplink beam.

There is another case that (one TRP or ideal backhaul for TRP1 and TRP2): if the PDCCHs using the beam 1 and beam 4 are received at the same time and the ACK/NACKs related to the PDCCHs are fed back at the same time, then the selection is made according to the priorities of the downlink beams, for example, it is defined that the priorities decrease as the downlink beam indexes change from smallest to largest, or the downlink beam 1 is the downlink primary beam, or the beam groups are defined and the beam group containing the downlink beam 1 has the highest priority, then the selection is made according to the PDCCH using the downlink beam 1, the uplink beam 1 is determined in accordance with the downlink beam 1, and the PUCCH is transmitted in accordance with the determined uplink beam, where the PUCCH carries the ACK/NACKs related to the PDCCHs using the beam 1 and beam 4 at the same time;

There is another case that (non-ideal backhaul for TRP1 and TRP2): if the PDCCHs using the beam 1 and beam 4 are received at the same time and the ACK/NACKs related to the PDCCHs are fed back at the same time, then the corresponding uplink beam 1 may be determined according to the downlink beam 1, and the PUCCH carrying the ACK/NACK related to the PDCCH using the downlink beam 1 is transmitted in accordance with the uplink beam 1; and the corresponding uplink beam 2 is determined according to the downlink beam 4, and the PUCCH carrying the ACK/NACK related to the PDCCH using the downlink beam 4 is transmitted in accordance with the uplink beam 2 (i.e., two PUCCHs are transmitted in parallel);

There is another case that: if the PDCCHs using the beam 1 and beam 4 are received at the same time, and the ACK/NACK related to the PDCCH using the beam 1 and the ACK/NACK related to the PDCCH using the beam 4 are not fed back at the same time, then the corresponding uplink beam 1 may be determined according to the downlink beam 1, and the PUCCH carrying the ACK/NACK related to the PDCCH using the downlink beam 1 is transmitted in accordance with the uplink beam 1 at the corresponding moment 1; and the corresponding uplink beam 2 is determined according to the downlink beam 4, and the PUCCH carrying the ACK/NACK related to the PDCCH using the downlink beam 4 is transmitted in accordance with the uplink beam 2 at the corresponding moment 2 (i.e., two PUCCHs are transmitted by Time Division Multiplexing (TDM)).

One or more of the above-mentioned technical solutions have the following technical effects or advantages.

In the embodiments of the invention, a solution of determining the uplink beam for the PUCCH transmission in the 5G NR is provided, which can support the PUCCH transmission scenario in the new wireless communication system to ensure the correct PUCCH transmission.

Further, in the embodiments of the invention, the uplink beam for the PUCCH transmission is determined according to the downlink beam used by the PDCCH and/or PDSCH, so the PUCCH transmission solution in the embodiments of the invention may adjust the required uplink beam by adjusting the PDCCH and/or PDSCH according to the actual demand, and can implement the correct PUCCH transmission without increasing the additional notification signalling.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A Physical Uplink Control Channel, PUCCH, transmission method, comprising:
    determining an uplink beam for PUCCH transmission according to a downlink beam used by a Physical Downlink Control Channel, PDCCH, and/or Physical Downlink Shared Channel, PDSCH;
    performing the PUCCH transmission with the determined uplink beam;
    wherein a beam is embodied as one of following:
    a Beam Pair Linkage, BPL, which is a beam pair between a sending beam at a sending end and a receiving beam at a receiving end, an uplink BPL being for uplink channel transmission, and a downlink BPL being for uplink channel transmission;
    a beam index, which is predefined or configured for distinguishing different beams; or
    a Quasi-Co-Location, QCL, relationship between a Demodulation Reference Signal, DMRS, port of a channel and a port of a reference signal;
    wherein determining an uplink beam for PUCCH transmission according to the downlink beam used by the PDCCH and/or PDSCH, and performing the PUCCH transmission with the determined uplink beam, comprises:
    determining a corresponding uplink BPL according to a downlink BPL corresponding to a received PDCCH and/or PDSCH, determining the uplink beam for the PUCCH transmission or a QCL relationship between a DMRS port of the PUCCH and a port on resources of a first reference signal according to the uplink BPL, and performing the PUCCH transmission with the uplink beam or the QCL relationship; or
    determining a QCL relationship between a DMRS port of the PUCCH and a port on resources of a first reference signal according to a QCL relationship between a DMRS port of the received PDCCH and/or PDSCH and a port on resources of a second reference signal, and performing the PUCCH transmission with the QCL relationship between the DMRS port of the PUCCH and the port on resources of the first reference signal; or
    determining a corresponding uplink BPL according to a QCL relationship between a DMRS port of the received PDCCH and/or PDSCH and a port on resources of a second reference signal, determining the uplink beam for the PUCCH transmission or a QCL relationship between a DMRS port of the PUCCH and a port on resources of a first reference signal according to the uplink BPL, and performing the PUCCH transmission with the uplink beam or the QCL relationship between the DMRS port of the PUCCH and the port on resources of a first reference signal; or
    determining a corresponding uplink beam index according to a QCL relationship between a DMRS port of the received PDCCH and/or PDSCH and a port on resources of a second reference signal, and performing the PUCCH transmission with the uplink beam corresponding to the uplink beam index.

2. The method of claim 1, wherein the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or
the PDSCH is PDSCH of which the ACK/NACK needs to be fed back on the PUCCH.

3. The method of claim 1, wherein the QCL relationship between the DMRS port of the PDCCH and/or PDSCH and the port on resources of the second reference signal comprises:
the DMRS port of the PDCCH and/or PDSCH, and all ports or a specified port on resources of a configured second reference signal are of QCL; or
the QCL relationship between the DMRS port of the PUCCH and the port on resources of the first reference signal includes:
the DMRS port of the PUCCH and all ports or a specified port on resources of a configured first reference signal are of QCL.

4. The method of claim 1, wherein determining an uplink beam for PUCCH transmission according to the downlink beam used by a PDCCH and/or PDSCH, comprises at least one of following methods:
Method 1:
determining an uplink beam corresponding to the downlink beam used by the PDCCH and/or PDSCH as the uplink beam for the PUCCH transmission according to a predetermined correspondence between one or more downlink beams and one uplink beam;
Method 2:
when a plurality of PDCCHs and/or PDSCHs are received, different downlink beams are used for the plurality of PDCCHs and/or PDSCHs and ACK/NACKs related to the plurality of PDCCHs and/or PDSCHs are fed back at a same time, determining a plurality of uplink beams corresponding to the plurality of downlink beams, and selecting one from the plurality of uplink beams as the uplink beam for the PUCCH transmission;
performing the PUCCH transmission with the determined uplink beam, comprises:
transmitting the ACK/NACKs related to the plurality of PDCCHs and/or PDSCHs on a same PUCCH with the determined uplink beam;
Method 3:
when a plurality of PDCCHs and/or PDSCHs are received, different downlink beams are used for the plurality of PDCCHs and/or PDSCHs and ACK/NACKs related to the plurality of PDCCHs and/or PDSCHs are fed back at a same time, selecting one from the plurality of downlink beams, and determining the uplink beam for the PUCCH transmission according to the selected downlink beam;
performing the PUCCH transmission with the determined uplink beam, comprises:
transmitting the ACK/NACKs related to the plurality of PDCCHs and/or PDSCHs on a same PUCCH with the determined uplink beam;
Method 4:
when a plurality of downlink beams and a plurality of uplink beams are divided into a plurality of groups where there is a correspondence between downlink and uplink beams in each group, then using any one or a combination of following ways:
first way: determining an uplink beam according to a downlink beam used by a received PDCCH and/or PDSCH, and determining that the uplink beam is used to transmit a PUCCH carrying ACK/NACK related to the PDCCH and/or PDSCH, wherein the downlink beam and the uplink beam are in a same group and have a correspondence, wherein ACK/NACKs related to PDCCHs and/or PDSCHs transmitted by using different downlink beams in a same beam group are transmitted at different times;
second way: when a plurality of PDCCHs and/or PDSCHs transmitted by using different downlink beams in a same group are received and ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, wherein the PUCCH carries the ACK/NACKs related to the PDCCHs and/or PDSCHs;
third way: when a plurality of PDCCHs and/or PDSCHs transmitted by using different downlink beams in a same group are received and ACK/NACKs related to the PDCCHs and/or PDSCHs are fed back at the same time, selecting one from the plurality of downlink beams, and determining the uplink beam for the PUCCH transmission according to the selected downlink beam, wherein the PUCCH carries the ACK/NACKs related to the PDCCHs and/or PDSCHs;
Method 5:
when a plurality of downlink beams are divided into a plurality of groups each of which corresponds to one uplink primary beam for the PUCCH transmission, then:
when a PDCCH and/or PDSCH transmitted by using a downlink beam belonging to a ith group is received, determining that an uplink primary beam corresponding to the ith group is used to transmit a PUCCH carrying ACK/NACK related to the PDCCH and/or PDSCH.

5. The method of claim 4, wherein selecting one from the plurality of uplink beams as the uplink beam for the PUCCH transmission, comprises:
selecting one from the plurality of uplink beams as the uplink beam for the PUCCH transmission according to pre-configured or pre-agreed priorities of uplink beams or cells; or
when the plurality of uplink beams contain a pre-configured or pre-agreed uplink primary beam, determining the uplink primary beam as the uplink beam for the PUCCH transmission; and when the plurality of uplink beams do contain the uplink primary beam, determining a secondary beam with a certain index in the plurality of uplink beams as the uplink beam for the PUCCH transmission; or
when there is an uplink beam corresponding to a pre-configured or pre-agreed primary cell in the plurality of uplink beams, taking the uplink beam corresponding to the primary cell as the uplink beam for the PUCCH transmission; and when there is no uplink beam corresponding to the primary cell in the plurality of uplink beams, taking an uplink beam corresponding to a secondary cell as the uplink beam for the PUCCH transmission;

and/or
wherein selecting one from the plurality of downlink beams, and determining the uplink beam for the PUCCH transmission according to the selected downlink beam, comprises:
selecting one downlink beam according to pre-configured or pre-agreed downlink beam priorities, beam group priorities or cell priorities, and determining the uplink beam for the PUCCH transmission according to the selected downlink beam; or
when a PDCCH and/or PDSCH transmitted by using a downlink primary beam is received, determining the uplink beam for the PUCCH transmission according to the downlink primary beam, and/or, when the PDCCH and/or PDSCH transmission is received on a primary cell, determining the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to a downlink secondary beam with a certain index used by the received PDCCH and/or PDSCH transmission, and/or, determining the uplink beam for the PUCCH transmission according to a downlink beam corresponding to a secondary cell receiving the PDCCH and/or PDSCH transmission; wherein the downlink primary beam and the primary cell are pre-configured or pre-agreed; or
when a PDCCH and/or PDSCH transmitted by using a downlink beam in a downlink primary beam group is received, determining an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determining an uplink secondary beam corresponding to the downlink secondary beam group as the uplink beam for the PUCCH transmission; and if there are a plurality of downlink secondary beam groups, then selecting one downlink secondary beam group in accordance with priorities of the downlink secondary beam groups or an order of the index of the downlink secondary beam groups.

6. A physical uplink control channel transmission method, comprising:
determining that a terminal determines an uplink beam for PUCCH transmission according to a downlink beam used by a PDCCH and/or PDSCH;
determining that the terminal performs the PUCCH transmission with the determined uplink beam;
wherein a beam is embodied as one of following:
a Beam Pair Linkage, BPL, which is a beam pair between a sending beam at a sending end and a receiving beam at a receiving end, an uplink BPL being for uplink channel transmission, and a downlink BPL being for uplink channel transmission;
a beam index, which is predefined or configured for distinguishing different beams; or
a Quasi-Co-Location, QCL, relationship between a Demodulation Reference Signal, DMRS, port of a channel and a port of a reference signal;
wherein determining that the terminal determines an uplink beam for PUCCH transmission according to a downlink beam used by a PDCCH and/or PDSCH, and performs the PUCCH transmission with the determined uplink beam, comprises:
determining that the terminal determines a corresponding uplink BPL according to a downlink BPL corresponding to the received PDCCH and/or PDSCH, determines the uplink beam for the PUCCH transmission or a QCL relationship between a DMRS port of the PUCCH and a port on resources of a first reference signal according to the uplink BPL, and performs the PUCCH transmission with the uplink beam or the QCL relationship; or
determining that the terminal determines a QCL relationship between a DMRS port of the PUCCH and a port on resources of a first reference signal according to a QCL relationship between a DMRS port of the received PDCCH and/or PDSCH and a port on resources of a second reference signal, and determining that the terminal performs the PUCCH transmission with the QCL relationship between the DMRS port of the PUCCH and the port on resources of the first reference signal; or
determining that the terminal determines a corresponding uplink BPL according to a QCL relationship between a DMRS port of the received PDCCH and/or PDSCH and a port on resources of a second reference signal, determines the uplink beam for the PUCCH transmission or a QCL relationship between a DMRS port of the PUCCH and a port on resources of a first reference signal according to the uplink BPL, and performs the PUCCH transmission with the uplink beam or the QCL relationship between the DMRS port of the PUCCH and the port on resources of the first reference signal; or
determining that the terminal determines a corresponding uplink beam index according to a QCL relationship between a DMRS port of the received PDCCH and/or PDSCH and a port on resources of a second reference signal, and determining that the terminal performs the PUCCH transmission with the uplink beam corresponding to the uplink beam index.

7. The method of claim 6, wherein the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or
the PDSCH is PDSCH of which the ACK/NACK needs to be fed back on the PUCCH.

8. The method of claim 6, wherein the QCL relationship between the DMRS port of the PDCCH and/or PDSCH and the port on resources of the second reference signal comprises:
the DMRS port of the PDCCH and/or PDSCH, and all ports or a specified port on resources of a configured second reference signal are of QCL; or
the QCL relationship between the DMRS port of the PUCCH and the port on resources of the first reference signal includes:
the DMRS port of the PUCCH and all ports or a specified port on resources of a configured first reference signal are of QCL.

9. The method of claim 6, wherein determining that the terminal determines an uplink beam for PUCCH transmission according to a downlink beam used by a PDCCH and/or PDSCH, comprises at least one of the following methods:

Method 1:
determining that the terminal determines an uplink beam corresponding to the downlink beam used by the PDCCH and/or PDSCH as the uplink beam for the PUCCH transmission according to a predetermined correspondence between one or more downlink beams and one uplink beam;

Method 2:
determining that the terminal determines an uplink beam for PUCCH transmission according to the downlink beam used by a PDCCH and/or PDSCH in accordance with a process of:
when a plurality of PDCCHs and/or PDSCHs are received, different downlink beams are used for the plurality of PDCCHs and/or PDSCHs and ACK/NACKs related to the plurality of PDCCHs and/or PDSCHs are fed back at a same time, determining a plurality of uplink beams corresponding to the plurality of downlink beams, and selecting one from the plurality of uplink beams as the uplink beam for the PUCCH transmission;
determining that the terminal performs the PUCCH transmission with the determined uplink beam in accordance with a process of:
transmitting the ACK/NACKs related to the plurality of PDCCHs and/or PDSCHs on a same PUCCH with the determined uplink beam;

Method 3:
determining that the terminal determines an uplink beam for PUCCH transmission according to a downlink beam used by a PDCCH and/or PDSCH in accordance with a process of:
when a plurality of PDCCHs and/or PDSCHs are received, different downlink beams are used for the plurality of PDCCHs and/or PDSCHs and ACK/NACKs related to the plurality of PDCCHs and/or PDSCHs are fed back at a same time, selecting one from the plurality of downlink beams, and determining the uplink beam for the PUCCH transmission according to the selected downlink beam;
determining that the terminal performs the PUCCH transmission with the determined uplink beam in accordance with a process of:
transmitting the ACK/NACKs related to the plurality of PDCCHs and/or PDSCHs on a same PUCCH with the determined uplink beam;

Method 4:
determining that the terminal determines an uplink beam for PUCCH transmission according to a downlink beam used by a PDCCH and/or PDSCH in accordance with a process of:
when a plurality of downlink beams and a plurality of uplink beams are divided into a plurality of groups where there is a correspondence between downlink and uplink beams in each group, then using any one or a combination of following ways:
first way: determining an uplink beam according to a downlink beam used by a received PDCCH and/or PDSCH, and determining that the uplink beam is used to transmit a PUCCH carrying ACK/NACK related to the PDCCH and/or PDSCH, wherein the downlink beam and the uplink beam are in a same group and have a correspondence, wherein ACK/NACKs related to PDCCHs and/or PDSCHs transmitted by using different downlink beams in a same beam group are transmitted at different times;
second way: when a plurality of PDCCHs and/or PDSCHs transmitted by using different downlink beams in a same group are received and ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, wherein the PUCCH carries the ACK/NACKs related to the PDCCHs and/or PDSCHs;
third way: when a plurality of PDCCHs and/or PDSCHs transmitted by using different downlink beams in a same group are received and ACK/NACKs related to the PDCCHs and/or PDSCHs are fed back at the same time, selecting one from the plurality of downlink beams, and determining the uplink beam for the PUCCH transmission according to the selected downlink beam, wherein the PUCCH carries the ACK/NACKs related to the PDCCHs and/or PDSCHs;

Method 5:
determining that the terminal determines an uplink beam for PUCCH transmission according to a downlink beam used by a PDCCH and/or PDSCH in accordance with a process of:
when a plurality of downlink beams are divided into a plurality of groups each of which corresponds to one uplink primary beam for the PUCCH transmission, then:
when a PDCCH and/or PDSCH transmitted by using a downlink beam belonging to a ith group is received, determining that an uplink primary beam corresponding to the ith group is used to transmit a PUCCH carrying ACK/NACK related to the PDCCH and/or PDSCH.

10. The method of claim 9, wherein selecting one from the plurality of uplink beams as the uplink beam for the PUCCH transmission, comprises:
selecting one from the plurality of uplink beams as the uplink beam for the PUCCH transmission according to pre-configured or pre-agreed priorities of uplink beams or cells; or
when the plurality of uplink beams contain a pre-configured or pre-agreed uplink primary beam, determining the uplink primary beam as the uplink beam for the PUCCH transmission; and when the plurality of uplink beams do not contain the uplink primary beam, determining a secondary beam with a certain index in the plurality of uplink beams as the uplink beam for the PUCCH transmission; or
when there is an uplink beam corresponding to a pre-configured or pre-agreed primary cell in the plurality of uplink beams, taking the uplink beam corresponding to the primary cell as the uplink beam for the PUCCH transmission; and when there is no uplink beam corresponding to the primary cell in the plurality of uplink beams, taking an uplink beam corresponding to a secondary cell as the uplink beam for the PUCCH transmission;
and/or
wherein selecting one from the plurality of downlink beams, and determining the uplink beam for the PUCCH transmission according to the selected downlink beam, comprises:

selecting one downlink beam according to pre-configured or pre-agreed uplink beam priorities, beam group priorities or cell priorities, and determining the uplink beam for the PUCCH transmission according to the selected downlink beam; or when a PDCCH and/or PDSCH transmitted by using a downlink primary beam is received, determining the uplink beam for the PUCCH transmission according to the downlink primary beam, and/or, when the PDCCH and/or PDSCH transmission is received on a primary cell, determining the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to a downlink secondary beam with a certain index used by the received PDCCH and/or PDSCH transmission, and/or, determining the uplink beam for the PUCCH transmission according to a downlink beam corresponding to a secondary cell receiving the PDCCH and/or PDSCH transmission; wherein the downlink primary beam and the primary cell are pre-configured or pre-agreed; or when a PDCCH and/or PDSCH transmitted by using a downlink beam in a downlink primary beam group is received, determining an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determining an uplink secondary beam corresponding to the downlink secondary beam group as the uplink beam for the PUCCH transmission; and if there are a plurality of downlink secondary beam groups, then selecting one downlink secondary beam group in accordance with priorities of the downlink secondary beam groups or an order of the index of the downlink secondary beam groups.

11. A user equipment, comprising a processor, and a memory and a transceiver connected with the processor, wherein:
the processor is configured to read programs in the memory to perform a process of:
determining an uplink beam for PUCCH transmission according to a downlink beam used by a PDCCH and/or PDSCH;
controlling the transceiver to perform the PUCCH transmission with the determined uplink beam;
wherein a beam is embodied as one of following:
a Beam Pair Linkage, BPL, which is a beam pair between a sending beam at a sending end and a receiving beam at a receiving end, an uplink BPL being for uplink channel transmission, and a downlink BPL being for uplink channel transmission;
a beam index, which is predefined or configured for distinguishing different beams; or
a Quasi-Co-Location, QCL, relationship between a Demodulation Reference Signal, DMRS, port of a channel and a port of a reference signal;

wherein the processor is further configured to read programs in the memory to perform a process of:
determining a corresponding uplink BPL according to a downlink BPL corresponding to a received PDCCH and/or PDSCH, determining the uplink beam for the PUCCH transmission or a QCL relationship between a DMRS port of the PUCCH and a port on resources of a first reference signal according to the uplink BPL, and performing the PUCCH transmission with the uplink beam or the QCL relationship; or determining a QCL relationship between a DMRS port of the PUCCH and a port on resources of a first reference signal according to a QCL relationship between a DMRS port of the received PDCCH and/or PDSCH and a port on resources of a second reference signal, and performing the PUCCH transmission with the QCL relationship between the DMRS port of the PUCCH and the port on resources of the first reference signal; or determining a corresponding uplink BPL according to a QCL relationship between a DMRS port of the received PDCCH and/or PDSCH and a port on resources of a second reference signal, determining the uplink beam for the PUCCH transmission or a QCL relationship between a DMRS port of the PUCCH and a port on resources of a first reference signal according to the uplink BPL, and performing the PUCCH transmission with the uplink beam or the QCL relationship between the DMRS port of the PUCCH and the port on resources of a first reference signal; or determining a corresponding uplink beam index according to a QCL relationship between a DMRS port of the received PDCCH and/or PDSCH and a port on resources of a second reference signal, and performing the PUCCH transmission with the uplink beam corresponding to the uplink beam index.

12. The user equipment of claim 11, wherein the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or
the PDSCH is PDSCH of which the ACK/NACK needs to be fed back on the PUCCH.

13. The user equipment of claim 11, wherein the QCL relationship between the DMRS port of the PDCCH and/or PDSCH and the port on resources of the second reference signal comprises:
the DMRS port of the PDCCH and/or PDSCH, and all ports or a specified port on resources of a configured second reference signal are of QCL; or
the QCL relationship between the DMRS port of the PUCCH and the port on resources of the first reference signal includes:
the DMRS port of the PUCCH and all ports or a specified port on resources of a configured first reference signal are of QCL.

14. The user equipment of claim 11, wherein determining an uplink beam for PUCCH transmission according to the downlink beam used by a PDCCH and/or PDSCH, comprises at least one of following methods:
Method 1:
determining an uplink beam corresponding to the downlink beam used by the PDCCH and/or PDSCH as the uplink beam for the PUCCH transmission according to a predetermined correspondence between one or more downlink beams and one uplink beam;

Method 2:
when a plurality of PDCCHs and/or PDSCHs are received, different downlink beams are used for the plurality of PDCCHs and/or PDSCHs and ACK/NACKs related to the plurality of PDCCHs and/or PDSCHs are fed back at a same time, determining a plurality of uplink beams corresponding to the plurality of downlink beams, and selecting one from the plurality of uplink beams as the uplink beam for the PUCCH transmission;
performing the PUCCH transmission with the determined uplink beam, comprises:
transmitting the ACK/NACKs related to the plurality of PDCCHs and/or PDSCHs on a same PUCCH with the determined uplink beam;
Method 3:
when a plurality of PDCCHs and/or PDSCHs are received, different downlink beams are used for the plurality of PDCCHs and/or PDSCHs and ACK/NACKs related to the plurality of PDCCHs and/or PDSCHs are fed back at a same time, selecting one from the plurality of downlink beams, and determining the uplink beam for the PUCCH transmission according to the selected downlink beam;
performing the PUCCH transmission with the determined uplink beam, comprises:
transmitting the ACK/NACKs related to the plurality of PDCCHs and/or PDSCHs on a same PUCCH with the determined uplink beam;
Method 4:
when a plurality of downlink beams and a plurality of uplink beams are divided into a plurality of groups where there is a correspondence between downlink and uplink beams in each group, then using any one or a combination of following ways:
first way: determining an uplink beam according to a downlink beam used by a received PDCCH and/or PDSCH, and determining that the uplink beam is used to transmit a PUCCH carrying ACK/NACK related to the PDCCH and/or PDSCH, wherein the downlink beam and the uplink beam are in a same group and have a correspondence, wherein ACK/NACKs related to PDCCHs and/or PDSCHs transmitted by using different downlink beams in a same beam group are transmitted at different times;
second way: when a plurality of PDCCHs and/or PDSCHs transmitted by using different downlink beams in a same group are received and ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, wherein the PUCCH carries the ACK/NACKs related to the PDCCHs and/or PDSCHs;
third way: when a plurality of PDCCHs and/or PDSCHs transmitted by using different downlink beams in a same group are received and ACK/NACKs related to the PDCCHs and/or PDSCHs are fed back at the same time, selecting one from the plurality of downlink beams, and determining the uplink beam for the PUCCH transmission according to the selected downlink beam, wherein the PUCCH carries the ACK/NACKs related to the PDCCHs and/or PDSCHs;

Method 5:
when a plurality of downlink beams are divided into a plurality of groups each of which corresponds to one uplink primary beam for the PUCCH transmission, then:
when a PDCCH and/or PDSCH transmitted by using a downlink beam belonging to a ith group is received, determining that an uplink primary beam corresponding to the ith group is used to transmit a PUCCH carrying ACK/NACK related to the PDCCH and/or PDSCH.

15. The user equipment of claim 14, wherein selecting one from the plurality of uplink beams as the uplink beam for the PUCCH transmission, comprises:
selecting one from the plurality of uplink beams as the uplink beam for the PUCCH transmission according to pre-configured or pre-agreed priorities of uplink beams or cells; or
when the plurality of uplink beams contain a pre-configured or pre-agreed uplink primary beam, determining the uplink primary beam as the uplink beam for the PUCCH transmission; and when the plurality of uplink beams do contain the uplink primary beam, determining a secondary beam with a certain index in the plurality of uplink beams as the uplink beam for the PUCCH transmission; or
when there is an uplink beam corresponding to a pre-configured or pre-agreed primary cell in the plurality of uplink beams, taking the uplink beam corresponding to the primary cell as the uplink beam for the PUCCH transmission; and when there is no uplink beam corresponding to the primary cell in the plurality of uplink beams, taking an uplink beam corresponding to a secondary cell as the uplink beam for the PUCCH transmission;
and/or
wherein selecting one from the plurality of downlink beams, and determining the uplink beam for the PUCCH transmission according to the selected downlink beam, comprises:
selecting one downlink beam according to pre-configured or pre-agreed downlink beam priorities, beam group priorities or cell priorities, and determining the uplink beam for the PUCCH transmission according to the selected downlink beam; or
when a PDCCH and/or PDSCH transmitted by using a downlink primary beam is received, determining the uplink beam for the PUCCH transmission according to the downlink primary beam, and/or, when the PDCCH and/or PDSCH transmission is received on a primary cell, determining the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to a downlink secondary beam with a certain index used by the received PDCCH and/or PDSCH transmission, and/or, determining the uplink beam for the PUCCH transmission according to a downlink beam corresponding to a secondary cell receiving the PDCCH and/or PDSCH transmission; wherein the downlink primary beam and the primary cell are pre-configured or pre-agreed; or
when a PDCCH and/or PDSCH transmitted by using a downlink beam in a downlink primary beam group is received, determining an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determining an uplink secondary beam corresponding to the downlink secondary beam group as the uplink beam for the PUCCH transmission; and if there are a plurality of downlink secondary beam groups, then selecting one downlink secondary beam group in accordance with priorities of the downlink secondary beam groups or an order of the index of the downlink secondary beam groups.

16. A physical uplink control channel transmission device, comprising a processor and a memory connected with the processor, wherein:
the processor is configured to read programs in the memory to perform a process of:
determining that a terminal determines an uplink beam for PUCCH transmission according to a downlink beam used by a PDCCH and/or PDSCH;
determining that the terminal performs the PUCCH transmission with the determined uplink beam;
wherein a beam is embodied as one of following:
a Beam Pair Linkage, BPL, which is a beam pair between a sending beam at a sending end and a receiving beam at a receiving end, an uplink BPL being for uplink channel transmission, and a downlink BPL being for uplink channel transmission;
a beam index, which is predefined or configured for distinguishing different beams; or
a Quasi-Co-Location, QCL, relationship between a Demodulation Reference Signal, DMRS, port of a channel and a port of a reference signal;
wherein determining that the terminal determines an uplink beam for PUCCH transmission according to a downlink beam used by a PDCCH and/or PDSCH, and performs the PUCCH transmission with the determined uplink beam, comprises:
determining that the terminal determines a corresponding uplink BPL according to a downlink BPL corresponding to the received PDCCH and/or PDSCH, determines the uplink beam for the PUCCH transmission or a QCL relationship between a DMRS port of the PUCCH and a port on resources of a first reference signal according to the uplink BPL, and performs the PUCCH transmission with the uplink beam or the QCL relationship; or
determining that the terminal determines a QCL relationship between a DMRS port of the PUCCH and a port on resources of a first reference signal according to a QCL relationship between a DMRS port of the received PDCCH and/or PDSCH and a port on resources of a second reference signal, and determining that the terminal performs the PUCCH transmission with the QCL relationship between the DMRS port of the PUCCH and the port on resources of the first reference signal; or
determining that the terminal determines a corresponding uplink BPL according to a QCL relationship between a DMRS port of the received PDCCH and/or PDSCH and a port on resources of a second reference signal, determines the uplink beam for the PUCCH transmission or a QCL relationship between a DMRS port of the PUCCH and a port on resources of a first reference signal according to the uplink BPL, and performs the PUCCH transmission with the uplink beam or the QCL relationship between the DMRS port of the PUCCH and the port on resources of the first reference signal; or
determining that the terminal determines a corresponding uplink beam index according to a QCL relationship between a DMRS port of the received PDCCH and/or PDSCH and a port on resources of a second reference signal, and determining that the terminal performs the PUCCH transmission with the uplink beam corresponding to the uplink beam index.

17. The device of claim 16, wherein the PDCCH is one or a combination of: a PDCCH of which ACK/NACK needs to be fed back on the PUCCH, a PDCCH corresponding to a PDSCH of which the ACK/NACK needs to be fed back on the PUCCH, and multicast PDCCH; and/or
the PDSCH is PDSCH of which the ACK/NACK needs to be fed back on the PUCCH.

18. The device of claim 16, wherein the QCL relationship between the DMRS port of the PDCCH and/or PDSCH and the port on resources of the second reference signal comprises:
the DMRS port of the PDCCH and/or PDSCH, and all ports or a specified port on resources of a configured second reference signal are of QCL; or
the QCL relationship between the DMRS port of the PUCCH and the port on resources of the first reference signal includes:
the DMRS port of the PUCCH and all ports or a specified port on resources of a configured first reference signal are of QCL.

19. The device of claim 16, wherein determining that the terminal determines an uplink beam for PUCCH transmission according to a downlink beam used by a PDCCH and/or PDSCH, comprises at least one of the following methods:
Method 1:
determining that the terminal determines an uplink beam corresponding to the downlink beam used by the PDCCH and/or PDSCH as the uplink beam for the PUCCH transmission according to a predetermined correspondence between one or more downlink beams and one uplink beam;
Method 2:
determining that the terminal determines an uplink beam for PUCCH transmission according to the downlink beam used by a PDCCH and/or PDSCH in accordance with a process of:
when a plurality of PDCCHs and/or PDSCHs are received, different downlink beams are used for the plurality of PDCCHs and/or PDSCHs and ACK/NACKs related to the plurality of PDCCHs and/or PDSCHs are fed back at a same time, determining a plurality of uplink beams corresponding to the plurality of downlink beams, and selecting one from the plurality of uplink beams as the uplink beam for the PUCCH transmission;
determining that the terminal performs the PUCCH transmission with the determined uplink beam in accordance with a process of:
transmitting the ACK/NACKs related to the plurality of PDCCHs and/or PDSCHs on a same PUCCH with the determined uplink beam;

Method 3:
determining that the terminal determines an uplink beam for PUCCH transmission according to a downlink beam used by a PDCCH and/or PDSCH in accordance with a process of:
when a plurality of PDCCHs and/or PDSCHs are received, different downlink beams are used for the plurality of PDCCHs and/or PDSCHs and ACK/NACKs related to the plurality of PDCCHs and/or PDSCHs are fed back at a same time, selecting one from the plurality of downlink beams, and determining the uplink beam for the PUCCH transmission according to the selected downlink beam;
determining that the terminal performs the PUCCH transmission with the determined uplink beam in accordance with a process of:
transmitting the ACK/NACKs related to the plurality of PDCCHs and/or PDSCHs on a same PUCCH with the determined uplink beam;
Method 4:
determining that the terminal determines an uplink beam for PUCCH transmission according to a downlink beam used by a PDCCH and/or PDSCH in accordance with a process of:
when a plurality of downlink beams and a plurality of uplink beams are divided into a plurality of groups where there is a correspondence between downlink and uplink beams in each group, then using any one or a combination of following ways:
first way: determining an uplink beam according to a downlink beam used by a received PDCCH and/or PDSCH, and determining that the uplink beam is used to transmit a PUCCH carrying ACK/NACK related to the PDCCH and/or PDSCH, wherein the downlink beam and the uplink beam are in a same group and have a correspondence, wherein ACK/NACKs related to PDCCHs and/or PDSCHs transmitted by using different downlink beams in a same beam group are transmitted at different times;
second way: when a plurality of PDCCHs and/or PDSCHs transmitted by using different downlink beams in a same group are received and ACK/NACKs related to the PDCCHs and/or PDSCHs are fed back at the same time, determining a plurality of uplink beams corresponding to the plurality of downlink beams in the group, and selecting one from the plurality of uplink beams as the uplink beam for the PUCCH transmission, wherein the PUCCH carries the ACK/NACKs related to the PDCCHs and/or PDSCHs;
third way: when a plurality of PDCCHs and/or PDSCHs transmitted by using different downlink beams in a same group are received and ACK/NACKs related to the PDCCHs and/or PDSCHs are fed back at the same time, selecting one from the plurality of downlink beams, and determining the uplink beam for the PUCCH transmission according to the selected downlink beam, wherein the PUCCH carries the ACK/NACKs related to the PDCCHs and/or PDSCHs;
Method 5:
determining that the terminal determines an uplink beam for PUCCH transmission according to a downlink beam used by a PDCCH and/or PDSCH in accordance with a process of:
when a plurality of downlink beams are divided into a plurality of groups each of which corresponds to one uplink primary beam for the PUCCH transmission, then:

when a PDCCH and/or PDSCH transmitted by using a downlink beam belonging to a ith group is received, determining that an uplink primary beam corresponding to the ith group is used to transmit a PUCCH carrying ACK/NACK related to the PDCCH and/or PDSCH.

20. The device of claim 19, wherein selecting one from the plurality of uplink beams as the uplink beam for the PUCCH transmission, comprises:
selecting one from the plurality of uplink beams as the uplink beam for the PUCCH transmission according to pre-configured or pre-agreed priorities of uplink beams or cells; or
when the plurality of uplink beams contain a pre-configured or pre-agreed uplink primary beam, determining the uplink primary beam as the uplink beam for the PUCCH transmission; and when the plurality of uplink beams do not contain the uplink primary beam, determining a secondary beam with a certain index in the plurality of uplink beams as the uplink beam for the PUCCH transmission; or
when there is an uplink beam corresponding to a pre-configured or pre-agreed primary cell in the plurality of uplink beams, taking the uplink beam corresponding to the primary cell as the uplink beam for the PUCCH transmission; and when there is no uplink beam corresponding to the primary cell in the plurality of uplink beams, taking an uplink beam corresponding to a secondary cell as the uplink beam for the PUCCH transmission;
and/or
wherein selecting one from the plurality of downlink beams, and determining the uplink beam for the PUCCH transmission according to the selected downlink beam, comprises:
selecting one downlink beam according to pre-configured or pre-agreed uplink beam priorities, beam group priorities or cell priorities, and determining the uplink beam for the PUCCH transmission according to the selected downlink beam; or
when a PDCCH and/or PDSCH transmitted by using a downlink primary beam is received, determining the uplink beam for the PUCCH transmission according to the downlink primary beam, and/or, when the PDCCH and/or PDSCH transmission is received on a primary cell, determining the uplink beam for the PUCCH transmission according to a downlink beam corresponding to the primary cell; and when no PDCCH and/or PDSCH transmitted by using the downlink primary beam is received or when no PDCCH and/or PDSCH transmission is received on the primary cell, determining the uplink beam for the PUCCH transmission according to a downlink secondary beam with a certain index used by the received PDCCH and/or PDSCH transmission, and/or, determining the uplink beam for the PUCCH transmission according to a downlink beam corresponding to a secondary cell receiving the PDCCH and/or PDSCH transmission; wherein the downlink primary beam and the primary cell are pre-configured or pre-agreed; or
when a PDCCH and/or PDSCH transmitted by using a downlink beam in a downlink primary beam group is received, determining an uplink primary beam corresponding to the primary beam group as the uplink beam for the PUCCH transmission, wherein the primary beam group and the uplink primary beam corresponding to the primary beam group are pre-configured or pre-defined; and when no PDCCH and/or PDSCH transmitted by using any downlink beam in the downlink primary beam group is received, if a PDCCH and/or PDSCH transmitted by using a downlink beam in a downlink secondary beam group is received, then determining an uplink secondary beam corresponding to the downlink secondary beam group as the uplink beam for the PUCCH transmission; and if there are a plurality of downlink secondary beam groups, then selecting one downlink secondary beam group in accordance with priorities of the downlink secondary beam groups or an order of the index of the downlink secondary beam groups.

* * * * *